United States Patent
Tobita et al.

(10) Patent No.: US 10,832,020 B2
(45) Date of Patent: Nov. 10, 2020

(54) INFORMATION PROCESSING SYSTEM AND METHOD FOR SECURE EXCHANGE OF INFORMATION

(71) Applicant: FeliCa Networks, Inc., Tokyo (JP)

(72) Inventors: Naoto Tobita, Tokyo (JP); Shuichi Sekiya, Saitama (JP); Tomoharu Hikita, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 427 days.

(21) Appl. No.: 14/416,172

(22) PCT Filed: Jul. 5, 2013

(86) PCT No.: PCT/JP2013/068467
§ 371 (c)(1),
(2) Date: Jan. 21, 2015

(87) PCT Pub. No.: WO2014/021053
PCT Pub. Date: Feb. 6, 2014

(65) Prior Publication Data
US 2015/0178530 A1  Jun. 25, 2015

(30) Foreign Application Priority Data

Jul. 31, 2012 (JP) ................. 2012-169150

(51) Int. Cl.
*G06K 7/10* (2006.01)
*G06Q 20/32* (2012.01)
*G06Q 20/34* (2012.01)

(52) U.S. Cl.
CPC ....... *G06K 7/10366* (2013.01); *G06Q 20/327* (2013.01); *G06Q 20/341* (2013.01); *G06Q 20/352* (2013.01)

(58) Field of Classification Search
None
See application file for complete search history.

(56) References Cited

U.S. PATENT DOCUMENTS 7,213,766 B2 *  5/2007  Ryan ............... G06F 13/385
                                                     235/472.02
8,516,565 B2    8/2013  Kato et al.
(Continued)

FOREIGN PATENT DOCUMENTS

JP    2005-165946 A    6/2005
JP    2005-267165 A    9/2005
(Continued)

OTHER PUBLICATIONS

Guoyu, et al. Summarize of RFID technology and typical application, 2011, Published in: Proceedings of 2011 Cross Strait Quad-Regional Radio Science and Wireless Technology Conference (vol. 2, pp. 1032-1036) (Year: 2011).*
(Continued)

*Primary Examiner* — Mohammad Z Shaikh
*Assistant Examiner* — Gregory S Cunningham, II
(74) *Attorney, Agent, or Firm* — Chip Law Group

(57) ABSTRACT

Provided is an information processing system including a server device, and a non-contact communication tag readable through NFC. The non-contact communication tag includes an identification information retaining unit that retains identification information for uniquely identifying the tag, an authentication information retaining unit that retains authentication information to be used in authentication of the non-contact communication tag, and a NFC unit that transmits the identification information and the authentication information to another device, which will transmit the received identification information and authentication information to the server device, in NFC with the other device. The server device includes an information acquisi-
(Continued)

tion unit that acquires the identification information, the authentication information, and other information transmitted from the other device, an authentication unit that authenticates the non-contact communication tag using the authentication information, and a process execution unit that executes a process according to the other information and the identification information after the authentication.

14 Claims, 15 Drawing Sheets

(56) References Cited

U.S. PATENT DOCUMENTS

| | | | | |
|---|---|---|---|---|
| 2007/0011729 A1* | 1/2007 | White | ............... | G06F 21/606 726/9 |
| 2008/0035724 A1* | 2/2008 | Vawter | ............... | G06Q 20/20 235/380 |
| 2008/0061945 A1* | 3/2008 | Hoshina | ............... | H04B 5/02 340/10.51 |
| 2008/0103972 A1* | 5/2008 | Lanc | ............... | G06Q 20/32 705/44 |
| 2009/0312011 A1* | 12/2009 | Huomo | ............... | G06K 7/0008 455/426.1 |
| 2010/0011212 A1* | 1/2010 | Anemikos | ............... | G06F 21/35 713/171 |
| 2012/0084210 A1* | 4/2012 | Farahmand | ............... | G06Q 20/40 705/64 |
| 2012/0094596 A1* | 4/2012 | Tysowski | ............... | G06Q 10/10 455/41.1 |
| 2013/0201000 A1* | 8/2013 | Solomon | ............... | G05B 1/01 340/5.83 |
| 2013/0239197 A1 | 9/2013 | Kato et al. | | |

FOREIGN PATENT DOCUMENTS

| | | |
|---|---|---|
| JP | 2006-119986 A | 5/2006 |
| JP | 2006-330811 A | 12/2006 |
| JP | 2007-213276 A | 8/2007 |
| JP | 2007-304634 A | 11/2007 |
| JP | 2011-086155 A | 4/2011 |

OTHER PUBLICATIONS

Khandavilli, et al., A mobile role-based access control system using identity-based encryption with zero knowledge proof, Jul. 11-13, 2012, 2012 IEEE Symposium on Computational Intelligence for Security and Defence Applications, entire document pertitent (Year: 2012).*

Khandavilli, et al., A mobile role-based access control system using identity-based encryption with zero knowledge proof, Jul. 11-13, 2012, 2012 IEEE Symposium on Computational Intelligence for Security and Defence Applications, entire document pertinent (Year: 2012).*

International Search Report from International Publication PCT/JP2013/068467 dated Aug. 13, 2013.

* cited by examiner

INFORMATION PROCESSING SYSTEM AND METHOD FOR SECURE EXCHANGE OF INFORMATION

CROSS-REFERENCE TO RELATED APPLICATION

The present application is a national phase entry under 35 U.S.C. § 371 of International Application No. PCT/JP2013/068467 filed Jul. 5, 2013, published on Feb. 6, 2014 as WO 2014/021053 A1, which claims priority from Japanese Patent Application No. JP 2012-169150 filed in the Japanese Patent Office on Jul. 31, 2012.

TECHNICAL FIELD

The present disclosure relates to an information processing system and an information processing method.

BACKGROUND ART

In recent years, systems that use the technology of near field communication using cards in which IC chips (IC cards) are embedded to enable use of automatic ticket checkers at stations, payment of product prices at stores with electronic money, and the like have become widespread. The near field communication is communication that can be performed by devices when they come within about, for example, 10 centimeters from each other. In such a system, when an IC card is held over a reader-writer, use of an automatic ticket checker at a station, payment of a product price at a store using electronic money, and the like are possible. Further, systems that enable use of automatic ticket checkers, payment of product prices, and the like in the same manner by embedding such an IC chip in a mobile telephone and holding the mobile telephone over a reader-writer have also become widespread.

Since such a mobile telephone stores value having high monetary value such as electronic money, various entrance tickets, and the like, an IC chip with a tamper resistance property is included therein. In addition, technologies for protecting such an IC chip with the tamper resistance property from illegitimate access have also been disclosed (for example, refer to Patent Literature 1). Smartphones with a near field communication function have started becoming widespread, and needs for payment of product prices at stores using electronic money are expected to be much higher.

CITATION LIST

Patent Literature

Patent Literature 1: JP 2011-086155A

SUMMARY OF INVENTION

Technical Problem

However, when such value is stored in a mobile telephone, an IC chip with the tamper resistance property should be included, or a mechanism that protects the IC chip from illegitimate access should be provided, which is a cause of increasing costs. In addition, when a user replaces his or her mobile telephone by purchase, uses a plurality of mobile telephones, or the like, moving value that has been stored in the mobile telephone to another mobile telephone is cumbersome.

Therefore, the present disclosure provides a novel and improved information processing system and information processing method that can suppress costs and enable secure exchange of information in near field communication while boosting convenience for users.

Solution to Problem

According to an embodiment of the present disclosure, there is provided an information processing system including a server device, and a non-contact communication tag of which information is readable through near field communication. The non-contact communication tag includes an identification information retaining unit configured to retain identification information for uniquely identifying the non-contact communication tag, an authentication information retaining unit configured to retain authentication information to be used in authentication of the non-contact communication tag, and a near field communication unit configured to transmit the identification information that the identification information retaining unit retains and the authentication information that the authentication information retaining unit retains to another device, which will transmit the received identification information and authentication information to the server device, in near field communication with the other device. The server device includes an information acquisition unit configured to acquire the identification information, the authentication information, and other information transmitted from the other device, an authentication unit configured to authenticate the non-contact communication tag using the authentication information, and a process execution unit configured to execute a process according to the other information and the identification information that the information acquisition unit acquires after the authentication of the non-contact communication tag by the authentication unit.

According to an embodiment of the present disclosure, there is provided an information processing method including a step of transmitting identification information for uniquely identifying a non-contact communication tag and authentication information used to authenticate the non-contact communication tag, which are received in near field communication between the non-contact communication tag and another device, to the other device that will transmit the identification information and the authentication information to a server device, a step of acquiring the identification information, the authentication information, and other information transmitted from the other device with the server device, a step of authenticating the non-contact communication tag with the server device using the authentication information, and a step of executing a process according to the acquired other information and identification information with the server device after the authentication of the non-contact communication tag in the step of authentication.

Advantageous Effects of Invention

According to the present disclosure described above, a novel and improved information processing system that can suppress costs and enable secure exchange of information in near field communication while boosting convenience for users can be provided.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.

<1. Embodiments of the present disclosure>
[Configuration example of an information processing system]
[Configuration example of a system server]
[Configuration example of an IC tag]
[Modified examples of an information processing system]
<2. Conclusion>

1. AN EMBODIMENT OF THE PRESENT DISCLOSURE

Figure 1:
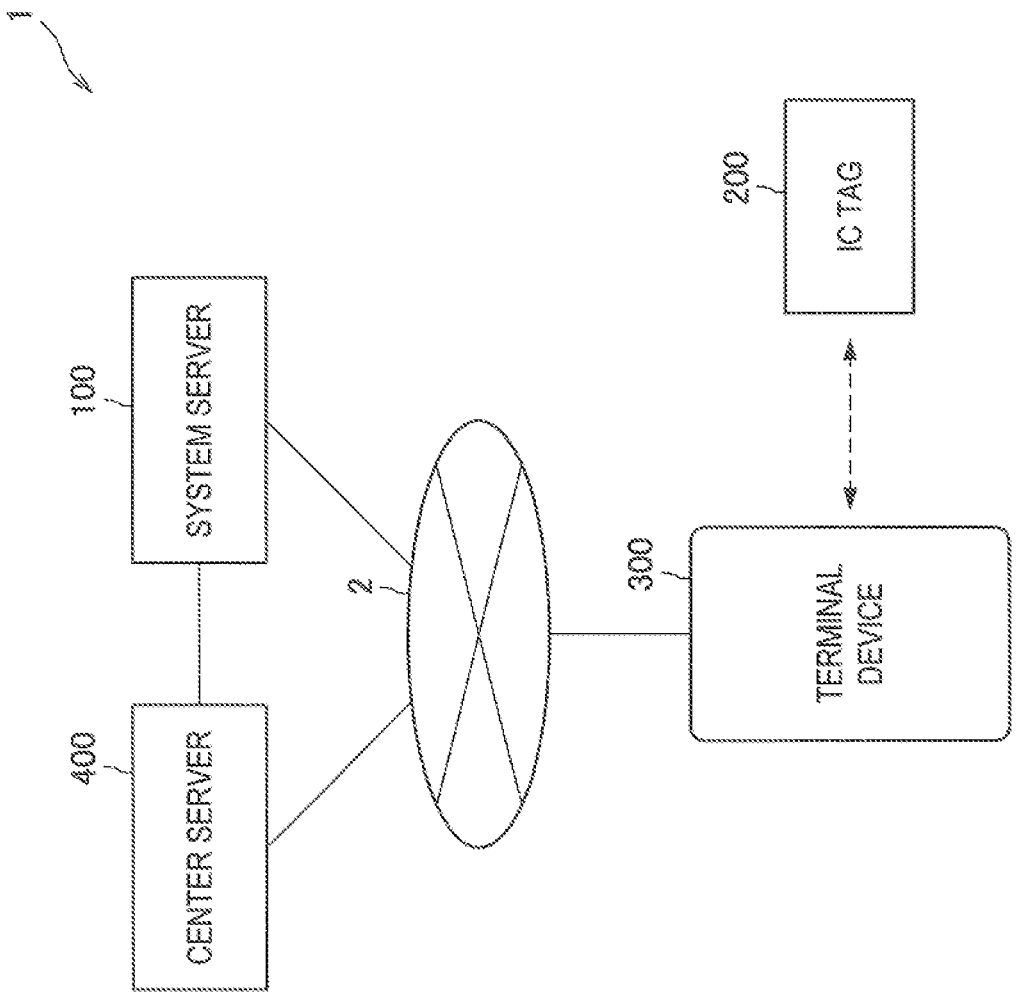
FIG. 1 is an illustrative diagram showing a configuration example of an information processing system 1 according to an embodiment of the present disclosure.

First, a configuration example of an information processing system according to an embodiment of the present disclosure will be described with reference to an accompanying drawing. FIG. 1 is an illustrative diagram showing the configuration example of the information processing system 1 according to the embodiment of the present disclosure. Hereinbelow, the configuration example of the information processing system 1 according to the embodiment of the present disclosure will be described using FIG. 1.

As shown in FIG. 1, the information processing system 1 according to the embodiment of the present disclosure is configured to include a system server 100, an IC tag 200, a terminal device 300, and a center server 400.

The system server 100 is a server device that manages information used in the information processing system 1 according to the embodiment of the present disclosure to control operations of the terminal device 300 through near field communication (NFC). As will be described later with respect to a specific configuration and operation of the system server 100, the system server 100 executes various information processes based on information transmitted from the terminal device 300 through a network 2. Here, the information transmitted from the terminal device 300 through the network 2 includes information that the terminal device 300 acquires from the IC tag 200 in the near field communication.

Using the information transmitted from the terminal device 300 as a result of the near field communication between the IC tag 200 and the terminal device 300, the system server 100 executes processes based on the information. In addition, after executing the processes based on the information transmitted from the terminal device 300, the system server 100 can give feedback on process results to the IC tag 200 and the terminal device 300.

The IC tag 200 is a tag that operates by receiving radio waves from the terminal device 300 when the terminal device 300 is held over the tag. When the terminal device 300 is held over the IC tag 200, the IC tag provides information to the terminal device 300 through the near field communication. The near field communication executed between the IC tag 200 and the terminal device 300 is communication performed at a frequency of, for example, 13.56 MHz. A functional configuration example of the IC tag 200 will be described later.

The terminal device 300 is a device that executes the near field communication with the IC tag 200 and thereby can read information recorded in the IC tag 200. Thus, the terminal device 300 is equipped with a reader-writer for reading such information recorded in the IC tag 200.

The center server 400 is a server that is managed by a business operator that provides various services. The center server 400 is a server that exchanges information with the system server 100 if necessary. The system server 100 executes exchange of information with the center server 400 when executing processes based on information transmitted from the terminal device 300 if necessary. By taking the opportunity of the process based on the information transmitted from the terminal device 300 to execute exchange of information with the center server 400, the system server 100 can provide various services that the center server 400 provides to the IC tag 200, the terminal device 300, and the like.

Herein, examples of services that the center server 400 provides will be presented. As services that the center server 400 provides, for example, there are a payment service for products using electronic money, and a service of using cash vouchers (for example, an electronic ticket service, a coupon provision service, and the like) that is an example of content of the present disclosure. It is of course needless to say that services that the center server 400 provides are not limited thereto, and various kinds of services can be provided as long as they use the near field communication between the IC tag 200 and the terminal device 300 as an opportunity.

The information processing system 1 according to the embodiment of the present disclosure gives the center server 400 value, while giving the terminal device 300 no value. In addition, the information processing system 1 according to the embodiment of the present disclosure takes the opportunity of the near field communication between the IC tag 200 and the terminal device 300 to execute services using the value that the center server 400 retains. The information processing system 1 according to the embodiment of the present disclosure can boost convenience for users while suppressing costs with the configuration shown in FIG. 1.

Further, when the near field communication between the IC tag 200 and the terminal device 300 has been performed in the information processing system 1 according to the embodiment of the present disclosure, the system server 100 authenticates the IC tag 200. Here, authentication of the IC tag 200 executed by the system server 100 is authentication of whether or not the IC tag 200 has been legitimately issued by the business operator that operates the system server 100. The system server 100 executes services using the value that the center server 400 retains only when the IC tag 200 has been authenticated. The information processing system 1 according to the embodiment of the present disclosure can perform secure exchange of information as the system server 100 authenticates the IC tag 200.

Note that the IC tag 200 may be provided with a display unit that displays various kinds of information, or may be connected to a display device that displays various kinds of information. By being provided with such a display unit or connected to such a display device, the IC tag 200 can cause results of processes performed by the system server 100 to be displayed.

In addition, although FIG. 1 illustrates one IC tag 200, terminal device 300, and center server 400, it is needless to say that the present disclosure is not limited thereto. It is needless to say that IC tags 200, terminal devices 300, and center servers 400 may each be provided in plural.

So far, the configuration example of the information processing system 1 according to the embodiment of the present disclosure has been provided using FIG. 1. Next, a functional configuration example of the system server 100 according to an embodiment of the present disclosure will be described.

[Configuration Example of a System Server]

Figure 2:
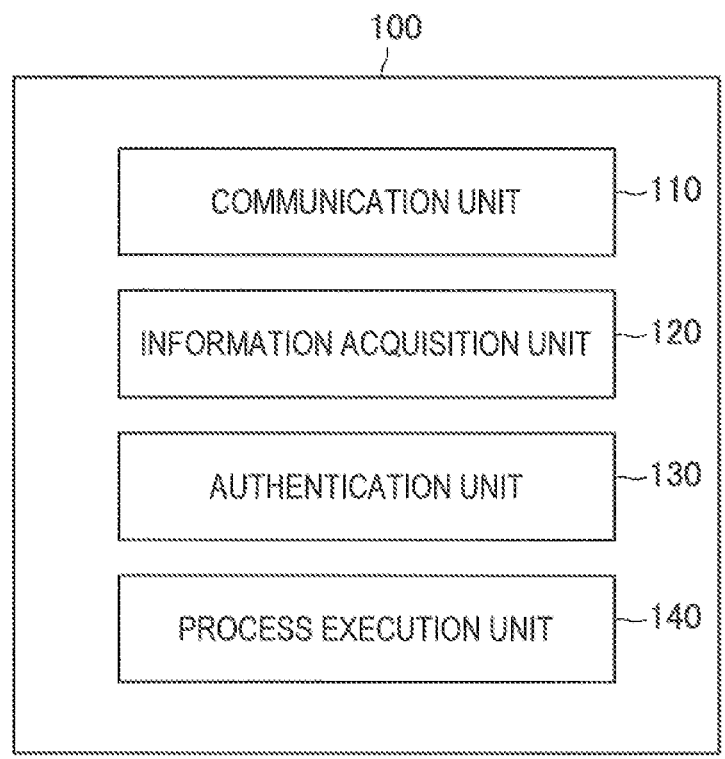
FIG. 2 is an illustrative diagram showing a functional configuration example of a system server 100 according to an embodiment of the present disclosure.

FIG. 2 is an illustrative diagram showing the functional configuration example of the system server 100 according to the embodiment of the present disclosure. Hereinbelow, the functional configuration example of the system server 100 according to the embodiment of the present disclosure will be described using FIG. 2.

As shown in FIG. 2, the system server 100 according to the embodiment of the present disclosure is configured to include a communication unit 110, an information acquisition unit 120, an authentication unit 130, and a process execution unit 140.

The communication unit 110 executes communication with other devices (the terminal device 300 and the center server 400), and performs transmission and reception of information. For example, the communication unit 110 receives information transmitted from the terminal device 300 through the network 2 when the terminal device 300 is held over the IC tag 200. Further, the information transmitted from the terminal device 300 and then received by the communication unit 110 is transferred to the information acquisition unit 120. In addition, when a result of a process performed by the process execution unit 140 to be described later is fed back to the terminal device 300 or the IC tag 200, the communication unit 110 transmits information regarding the result of the process performed by the process execution unit 140 to the terminal device 300 through the network 2.

The information acquisition unit 120 acquires information that has been acquired by the communication unit 110 through communication with other devices (the terminal device 300 and the center server 400). The information acquired by the information acquisition unit 120 is provided to the authentication unit 130 and the process execution unit 140 to be described later.

The information acquired by the information acquisition unit 120 includes a tag ID for uniquely identifying the IC tag 200 that the IC tag 200 retains, authentication information for authenticating the IC tag 200, and the like. The information acquisition unit 120 provides the authentication unit 130 with the authentication information for authenticating the IC tag 200, and provides the process execution unit 140 with the tag ID for uniquely identifying the IC tag 200.

The authentication unit 130 performs authentication of the IC tag 200. The authentication of the IC tag 200 by the authentication unit 130 is performed, for example, as follows. The authentication information is saved in the IC tag 200 in advance, and the IC tag 200 provides the saved authentication information to the terminal device 300 during the near field communication between the IC tag 200 and the terminal device 300. Then, the terminal device 300 provides the authentication information provided from the IC tag 200 to the system server 100 through the network 2. The system server 100 acquires the authentication information transmitted from the terminal device 300 with the information acquisition unit 120, and then executes authentication of the IC tag 200 with the authentication unit 130 using the acquired authentication information. The authentication unit 130 can authenticate whether or not the IC tag 200 over which the terminal device 300 has been held has been legitimately registered by the business operator that operates the system server 100.

The process execution unit 140 executes various processes based on the information acquired by the information acquisition unit 120. The various processes executed by the process execution unit 140 are based on the tag ID of the IC tag 200 and information input or set in the terminal device 300 transmitted from the terminal device 300. The process execution unit 140 may execute the various processes based on the information acquired by the information acquisition unit 120 under the condition that the authentication unit 130 has authenticated the IC tag 200. In addition, the information recorded in the IC tag 200 may be set to be read by the process execution unit 140 after the authentication unit 130 authenticates the IC tag 200.

The process execution unit 140 can decide a process to be executed according to information transmitted from the terminal device 300. For example, when it is ascertained from the tag ID of the IC tag 200 that the IC tag 200 is an IC tag for executing payment of a product price using electronic money, the process execution unit 140 requests payment of the product price from the center server 400 using information input or set in the terminal device 300. Then, the process execution unit 140 acquires a result of the payment process of the product price performed by the center server 400, and then feeds the result back to the terminal device 300.

For example, when it is ascertained from the tag ID of the IC tag 200 that the IC tag 200 is an IC tag for executing a process of entrance using an electronic ticket, the process execution unit 140 requests a process of the electronic ticket from the center server 400 using information input or set in the terminal device 300. Then, the process execution unit 140 acquires a result of the process of the electronic ticket performed by the center server 400, and then feeds the result back to the terminal device 300.

In addition, when it is ascertained from the tag ID of the IC tag 200 that the IC tag 200 is an IC tag for providing an electronic coupon, for example, the process execution unit 140 requests a process of providing the electronic coupon from the center server 400 using information input or set in the terminal device 300. Then, the process execution unit 140 acquires a result of the process of providing the electronic coupon performed by the center server 400, and then feeds the result back to the terminal device 300.

As described above, the process execution unit 140 can decide a process to be executed according to information transmitted from the terminal device 300. Note that the process execution unit 140 may retain a table indicating with which service the tag ID of the IC tag 200 is associated. The process execution unit 140 may decide a process to be executed according to information transmitted from the terminal device 300 with reference to the table.

In addition, the process execution unit 140 may retain a table in which the tag ID of the IC tag 200 is associated with attribute information. Then, the process execution unit 140 may execute a process based on the attribute information with reference to the attribute information of the tag ID of the IC tag 200. The attribute information of the tag ID of the IC tag 200 may include, for example, a position attribute, an operation attribute, and the like. In addition, the attribute information of the tag ID of the IC tag 200 may also include association with the above-described services.

When, for example, a URL is designated as attribute information of a tag ID, the process execution unit 140 may instruct the terminal device 300 that was held over the IC tag 200 having the tag ID to activate a browser application to connect to the URL. When an application is designated as attribute information of a certain tag ID, the process execution unit 140 may instruct the terminal device 300 that was held over the IC tag 200 having the tag ID to activate the designated application.

So far the functional configuration example of the system server 100 according to the embodiment of the present disclosure has been described using FIG. 2. Next, a functional configuration example of the IC tag 200 according to an embodiment of the present disclosure will be described.

[Configuration Example of an IC Tag]

Figure 3:
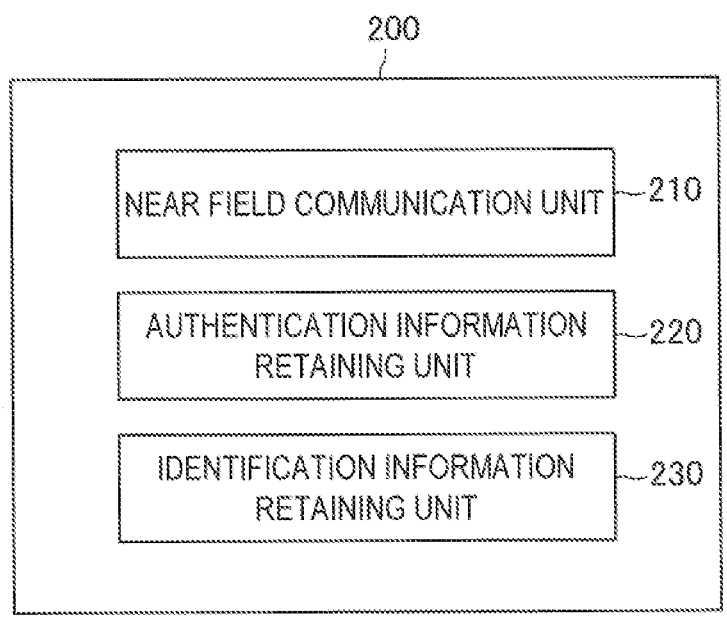
FIG. 3 is an illustrative diagram showing a functional configuration example of an IC tag 200 according to an embodiment of the present disclosure.

FIG. 3 is an illustrative diagram showing the functional configuration example of the IC tag 200 according to the embodiment of the present disclosure. Hereinbelow, the functional configuration example of the IC tag 200 according to the embodiment of the present disclosure will be described using FIG. 3.

As shown in FIG. 3, the IC tag 200 according to the embodiment of the present disclosure is configured to include a near field communication unit 210, an authentication information retaining unit 220, and an identification information retaining unit 230.

The near field communication unit 210 executes the near field communication with a near field communication unit 313 of the terminal device 300 to be described later at a predetermined frequency. As described above, the near field communication executed between the IC tag 200 and the terminal device 300 is communication performed at a frequency of, for example, 13.56 MHz.

The near field communication unit 210 may encrypt information during transmission of the information in order to prevent the information from being tampered with in the middle of communication with the system server 100 that is performed via the terminal device 300. Then, the system server 100 may be embedded with a key for decrypting the information encrypted by the near field communication unit 210. Likewise, the system server 100 may encrypt information during transmission of the information from the communication unit 110. Then, the IC tag 200 may be embedded with a key for decrypting the information encrypted by the communication unit 110.

The authentication information retaining unit 220 retains authentication information for authenticating the IC tag 200 over which the terminal device 300 has been held in the system server 100. The authentication information that the authentication information retaining unit 220 retains is authentication information for, for example, performing authentication in the system server 100. As the IC tag 200 provides the authentication information that the authentication information retaining unit 220 retains to the system server 100 via the terminal device 300, the IC tag 200 can be authenticated by the system server 100.

The identification information retaining unit 230 retains identification information for uniquely identifying the IC tag 200. The identification information for uniquely identifying the IC tag 200 that the identification information retaining unit 230 retains is, for example, a tag ID. The tag ID is an ID that is uniquely given to the IC tag 200 by the business operator that manages the system server 100 and issues the IC tag 200. The identification information that the identification information retaining unit 230 retains is provided to the terminal device 300 through the near field communication when the terminal device 300 is held over the IC tag. The terminal device 300 transmits the identification information acquired from the IC tag 200 through the near field communication to the system server 100. As the terminal device 300 transmits the identification information acquired from the IC tag to the system server 100, the system server 100 can know with which IC tag 200 the terminal device 300 has performed the near field communication.

The IC tag 200 according to the embodiment of the present disclosure can execute the near field communication with the terminal device 300 and thereby provide information to the terminal device 300 with the configuration shown in FIG. 3. In addition, the IC tag 200 according to the embodiment of the present disclosure can cause the system server 100 to authenticate the IC tag 200, and thereby let the system server 100 know with which IC tag 200 the terminal device 300 has performed the near field communication with the configuration shown in FIG. 3.

So far, the functional configuration example of the IC tag 200 according to the embodiment of the present disclosure has been described using FIG. 3. Next, a functional configuration example of the terminal device 300 according to an embodiment of the present disclosure will be described.

[Functional Configuration Example of a Terminal Device]

Figure 4:
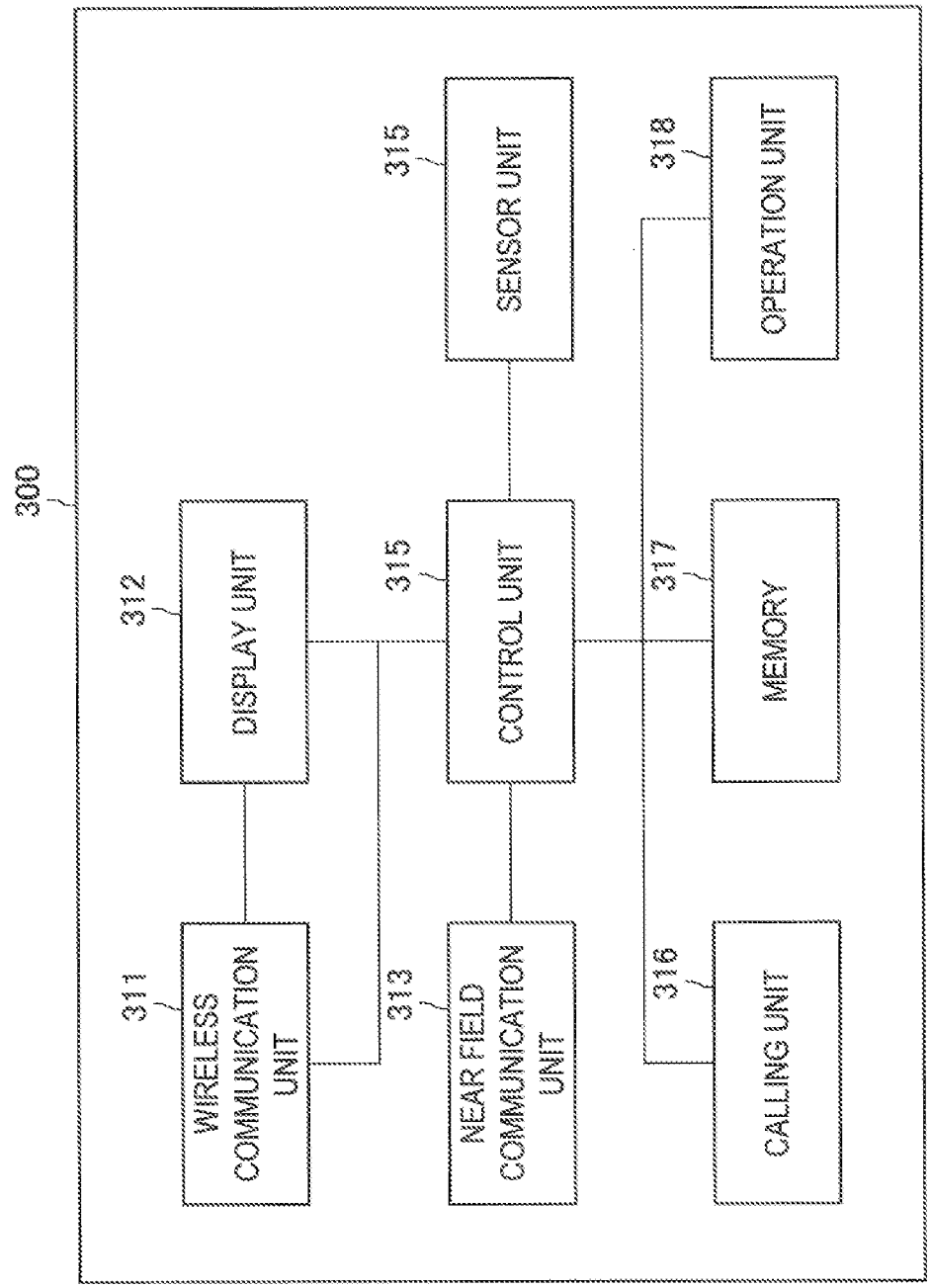
FIG. 4 is an illustrative diagram showing a functional configuration example of a terminal device 300 according to an embodiment of the present disclosure.

FIG. 4 is an illustrative diagram showing the functional configuration example of the terminal device 300 according to the embodiment of the present disclosure. Hereinbelow, the functional configuration example of the terminal device 300 according to the embodiment of the present disclosure will be described using FIG. 4.

As shown in FIG. 4, the terminal device 300 according to the embodiment of the present disclosure is configured to include a wireless communication unit 311, a display unit 312, a near field communication unit 313, a control unit 314, a sensor unit 315, a calling unit 316, a memory 317, and an operation unit 318.

The wireless communication unit 311 performs wireless communication with another device (for example, the system server 100) through a wireless network. The display unit 312 displays information that the wireless communication unit 311 receives, and information according to an operation performed by a user with respect to the operation unit 318. The display unit 312 is configured by, for example, a flat-type image display panel such as a liquid crystal display or an organic EL display. In addition, in the terminal device 300 according to the embodiment of the present disclosure, a touch panel may be provided for the display unit 312.

The near field communication unit 313 performs transmission and reception of information with the IC tag 200 by executing near field communication with the IC tag 200. The near field communication unit 313 is configured as, for example, a reader-writer, and performs transmission and reception of information with the IC tag 200 by emitting predetermined radio waves to cause the IC tag 200 to generate electromotive force. The control unit 314 controls operations of the terminal device 300. For example, the control unit 314 executes a program stored in the memory 317, and thereby controls an operation of the terminal device 300. As control of operations of the terminal device 300 by the control unit 314, for example, there is execution of a basic application for activating an application according to the IC tag 200 through communication of the near field communication unit 313 with the IC tag 200.

The sensor unit 315 is a sensor that senses various kinds of information. Sensors constituting the sensor unit 315 may be, for example, a position sensor that acquires a current position, a temperature sensor that acquires a current temperature, a biometric sensor that acquires information of fingerprints and veins of a user, and the like. As the sensor unit 315 senses various kinds of information, the control unit 314 can use the information that the sensor unit 315 senses as additional information obtained when the terminal device 300 is held over the IC tag 200.

The calling unit 316 is constituted by, for example, a speaker and a microphone, and executes a call based on voices with another mobile telephone or a fixed telephone. The memory 317 is constituted by, for example, a read only memory (ROM), a random access memory (RAM), and the like, and is used to store programs for controlling operations of the terminal device 300. The operation unit 318 is constituted by buttons for operating the terminal device 300. According to operations of the operation unit 318, the control unit 314 controls operations of the terminal device 300. Note that, when a touch panel is provided in the display unit 312, the touch panel also functions as the operation unit 318.

Note that, although FIG. 4 shows the configuration of the terminal device 300 in which the calling unit 316 is included, the present disclosure is not limited to this example. In other words, when the calling function is not necessary for the terminal device 300, the configuration of the terminal device 300 may exclude the calling unit 316.

So far, the functional configuration example of the terminal device 300 according to the embodiment of the present disclosure has been described using FIG. 4. By having the configuration shown in FIG. 4, the terminal device 300 according to the embodiment of the present disclosure can execute near field communication with the IC tag 200, and thereby can transmit information acquired from the IC tag 200 to the system server 100.

Next, an operation example of respective devices constituting the information processing system 1 according to an embodiment of the present disclosure will be described.

[Operation Example of an Information Processing System]

Figure 5:
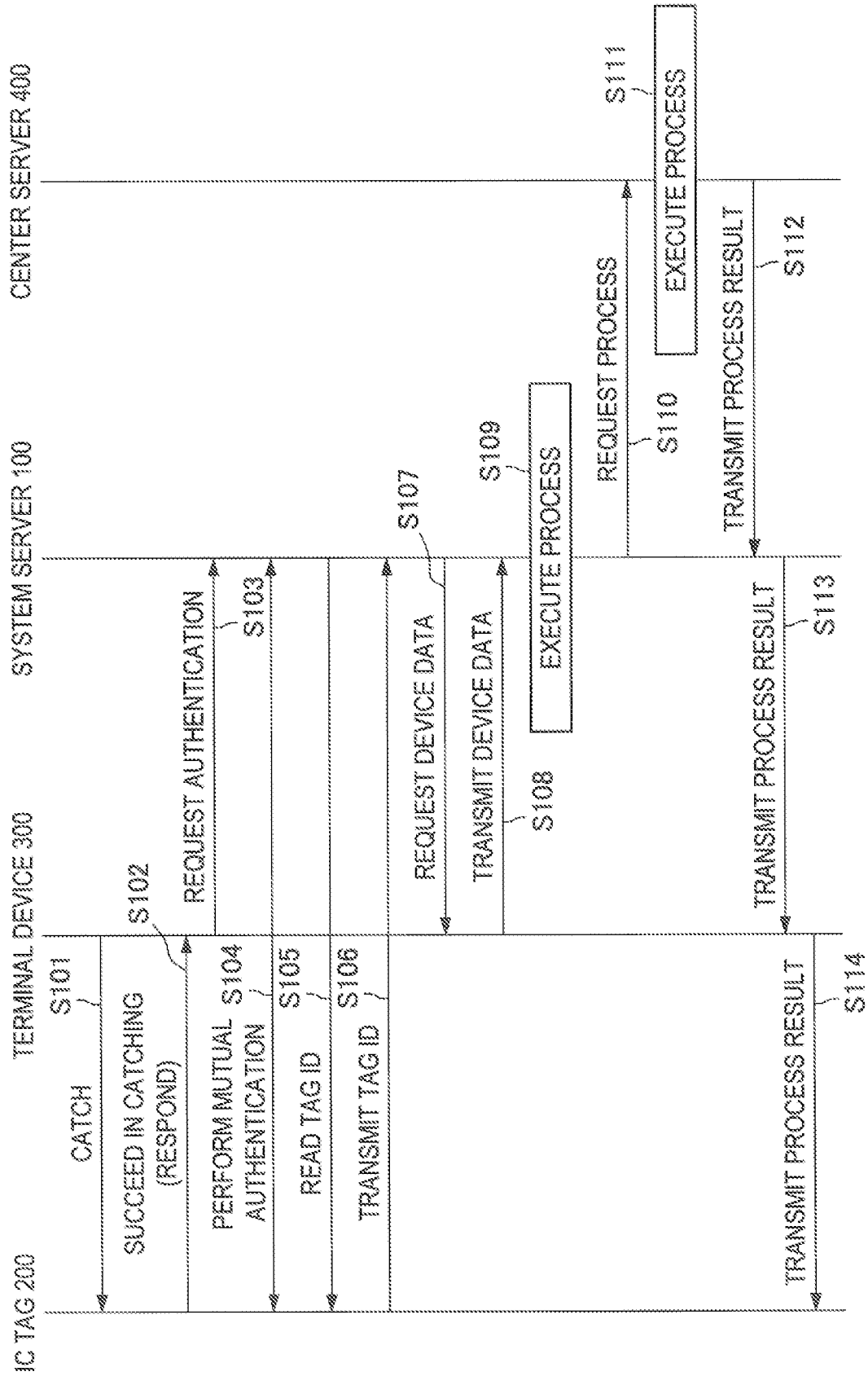
FIG. 5 is a flowchart showing an operation example of respective devices constituting the information processing system 1 according to an embodiment of the present disclosure.

FIG. 5 is a flowchart showing an operation example of the respective devices constituting the information processing system 1 according to an embodiment of the present disclosure. Hereinbelow, the operation example of the respective devices constituting the information processing system 1 according to the embodiment of the present disclosure will be described using FIG. 5.

The information processing system 1 according to the embodiment of the present disclosure takes the opportunity of the terminal device 300 being held over the IC tag 200 to operate. When the terminal device 300 is brought near the IC tag 200 within the distance that enables the near field communication with the IC tag 200, the IC tag 200 starts an operation with electromotive force derived from radio waves emitted from the near field communication unit 313 of the terminal device 300. Then, the terminal device 300 catches the IC tag 200 using the near field communication unit 313 (Step S101). The near field communication unit 210 of the IC tag 200 responds that the IC tag 200 has been successfully caught by the terminal device 300 (Step S102).

When the near field communication unit 313 receives the response that the IC tag 200 has been successfully caught, the terminal device 300 transmits a request for authenticating the caught IC tag 200 to the system server 100 with the wireless communication unit 311 (Step S103). When the system server 100 receives the request for authenticating the IC tag 200 from the terminal device 300, the mutual authentication is performed between the system server 100 and the IC tag 200 (Step S104). During the mutual authentication of Step S104, the authentication information retained in the authentication information retaining unit 220 is used. The authentication information retained in the authentication information retaining unit 220 is transmitted to the terminal device 300 through the near field communication with the terminal device 300, and then transferred from the terminal device 300 to the system server 100. As the mutual authentication is performed between the system server 100 and the IC tag 200, the system server 100 can read information recorded in the IC tag 200, or write information in the IC tag 200.

When the mutual authentication is performed between the system server 100 and the IC tag 200, the system server 100 then reads the tag ID of the IC tag 200 through the terminal device 300 (Step S105). The IC tag 200 transmits the tag ID to the terminal device 300 through the near field communication. Then, the terminal device 300 transmits the tag ID received from the IC tag 200 to the system server 100 (Step S106).

When reading the tag ID recorded in the IC tag 200, the system server 100 then requests device data that the terminal device 300 has from the terminal device 300 (Step S107). The terminal device 300 transmits the device data that the device has to the system server 100 in response to the request from the system server 100 (Step S108). Note that, when the terminal device 300 transmits the device data to the system server 100 in Step S108, information set or input in the terminal device 300 may also be transmitted to the system server 100. The information set or input in the terminal device 300 may be, for example, intrinsic information to the terminal device 300, information for identifying a service that the terminal device 300 intends to use, user information of the user who uses the terminal device 300 with respect to a service that the center server 400 provides, and the like. To be more specific, the information set or input in the terminal device 300 may be a user ID, a personal identification number (PIN), and the like input by the user of the terminal device 300 when an application has been activated in the terminal device 300 to receive a service that the center server 400 provides. In addition, the user ID input by the user of the terminal device 300 may include biometric information such as fingerprint information or vein information acquired by the sensor unit 315. The system server 100 can execute an authentication process with respect to the terminal device 300 with the process execution unit 140 using the information set or input in the terminal device 300 transmitted from the terminal device 300.

After receiving the information transmitted from the terminal device 300 with the communication unit 110, the system server 100 acquires the information with the information acquisition unit 120. Then, the system server 100 executes a process based on the information transmitted from the terminal device 300 with the process execution unit 140 (Step S109). Then, the system server 100 requests a process based on the information transmitted from the terminal device 300 from the center server 400 with the process execution unit 140 based on the process of Step S109 (Step S110).

The process executed by the process execution unit 140 in Step S109 differs depending on content of the information transmitted from the terminal device 300. To be specific, the process differs depending on content of services that the terminal device 300 intends to use. If the service that the terminal device 300 intends to use is a payment service of a product price using electronic money, for example, the process execution unit 140 makes a payment process request to the center server 400 that provides the payment service of product prices using electronic money. In addition, if the service that the terminal device 300 intends to use is an electronic ticket entrance service, the process execution unit 140 makes a ticket process request to the center server 400 that provides the electronic ticket entrance service.

The center server 400 executes the process based on the request from the system server 100 (Step S111), and then replies to the system server 100 with a result of the process (Step S112). Upon accepting the result of the process from the center server 400, the system server 100 transmits the result of the process to the terminal device 300 from the communication unit 110 (Step S113). Upon receiving the result of the process of the center server 400 with the wireless communication unit 311, the terminal device 300 transmits the received result of the process of the center server 400 to the IC tag 200 through the near field communication with the near field communication unit 313 (Step S114). Upon receiving the result of the process of the center server 400, the IC tag 200 can retain the result of the process of the center server 400 inside the IC tag 200. Note that this process of Step S114 may not necessarily be performed. In other words, the result of the process of the center server 400 may be left with up to the terminal device 300.

As the respective devices operate as shown in FIG. 5 in the information processing system 1 according to the embodiment of the present disclosure, the exchange of information between the system server 100 and the IC tag 200 is performed via the terminal device 300 after the mutual authentication between the system server 100 and the IC tag 200, which enables the exchange of information between the system server 100 and the IC tag 200 via the terminal device 300, and thus it is not necessary to provide an IC chip that has a tamper resistance property in the terminal device 300, and value can be retained on the server side, and therefore, convenience for users can be boosted while suppressing costs. In addition, since the system server 100 performs authentication of the IC tag 200 before the exchange of information between the system server 100 and the IC tag 200, secure exchange of information between the IC tag 200 and the terminal device 300 during near field communication is possible.

Next, a modified example of the IC tag 200 according to an embodiment of the present disclosure will be described. As shown in FIG. 5, the IC tag 200 can receive the result of the process of the center server 400 through the terminal device 300; however, explicitly displaying of the result of the process of the center server 400 can help the user of the terminal device 300 visually recognize the result of the process of the center server 400.

Figure 6:
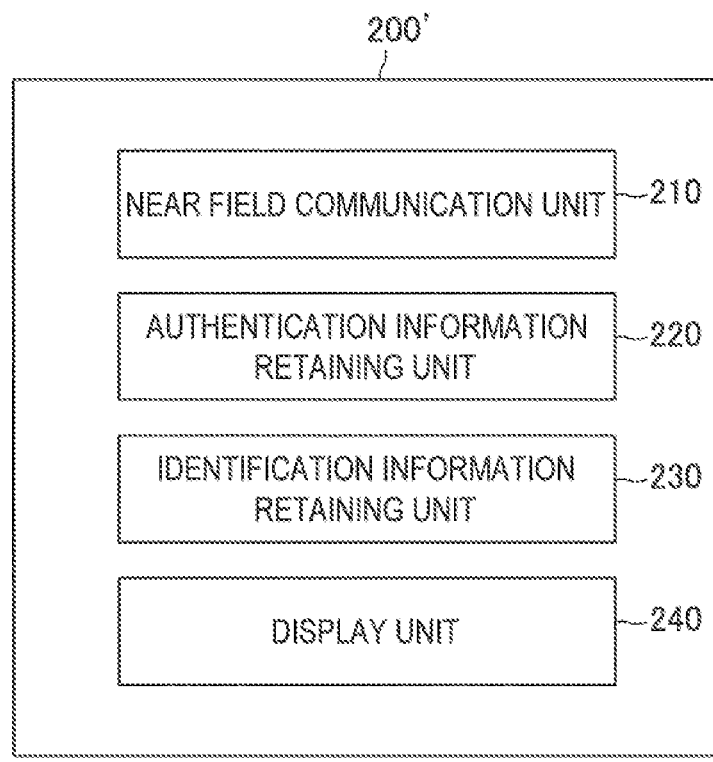
FIG. 6 is an illustrative diagram showing an IC tag 200' that is a modified example of the IC tag 200 according to an embodiment of the present disclosure.

FIG. 6 is an illustrative diagram showing an IC tag 200' that is a modified example of the IC tag 200 according to an embodiment of the present disclosure. The IC tag 200' shown in FIG. 6 has a configuration in which a display unit 240 is added to the IC tag 200 shown in FIG. 3. The display unit 240 is configured as, for example, electronic paper, a liquid crystal display, an organic EL display, or the like, which displays various kinds of information. The information that the display unit 240 displays is, for example, a message that prompts the user of the terminal device 300 to hold the terminal device 300 over the tag, the result of the process of the center server 400, and the like.

Figure 7:
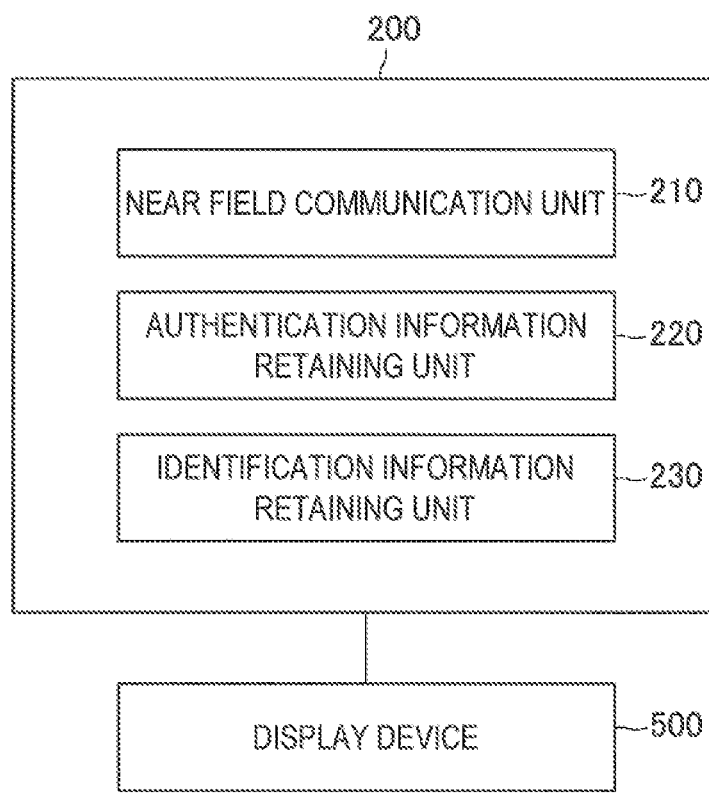
FIG. 7 is an illustrative diagram showing a state in which a display device 500 is connected to the IC tag 200 according to an embodiment of the present disclosure.

In the present disclosure, the IC tag itself may not have the display function. FIG. 7 is an illustrative diagram showing a state in which a display device 500 is connected to the IC tag 200 according to an embodiment of the present disclosure. The display device 500 is configured as, for example, electronic paper, a liquid crystal display, an organic EL display, or the like, which displays various kinds of information. The information that the display device 500 displays is, for example, a message that prompts the user of the terminal device 300 to hold the terminal device 300 over the tag, the result of the process of the center server 400, and the like. As described above, even though the IC tag 200 is not provided with the display function, by being connected to the display device 500, the IC tag 200 can cause the display device 500 to display the result of the process of the center server 400.

Next, a more specific example of the operation example of the respective devices constituting the information processing system 1 according to an embodiment of the present disclosure will be described. A case in which the display device 500 is connected to the IC tag 200 as shown in FIG. 7 will be described below.

Figure 8:
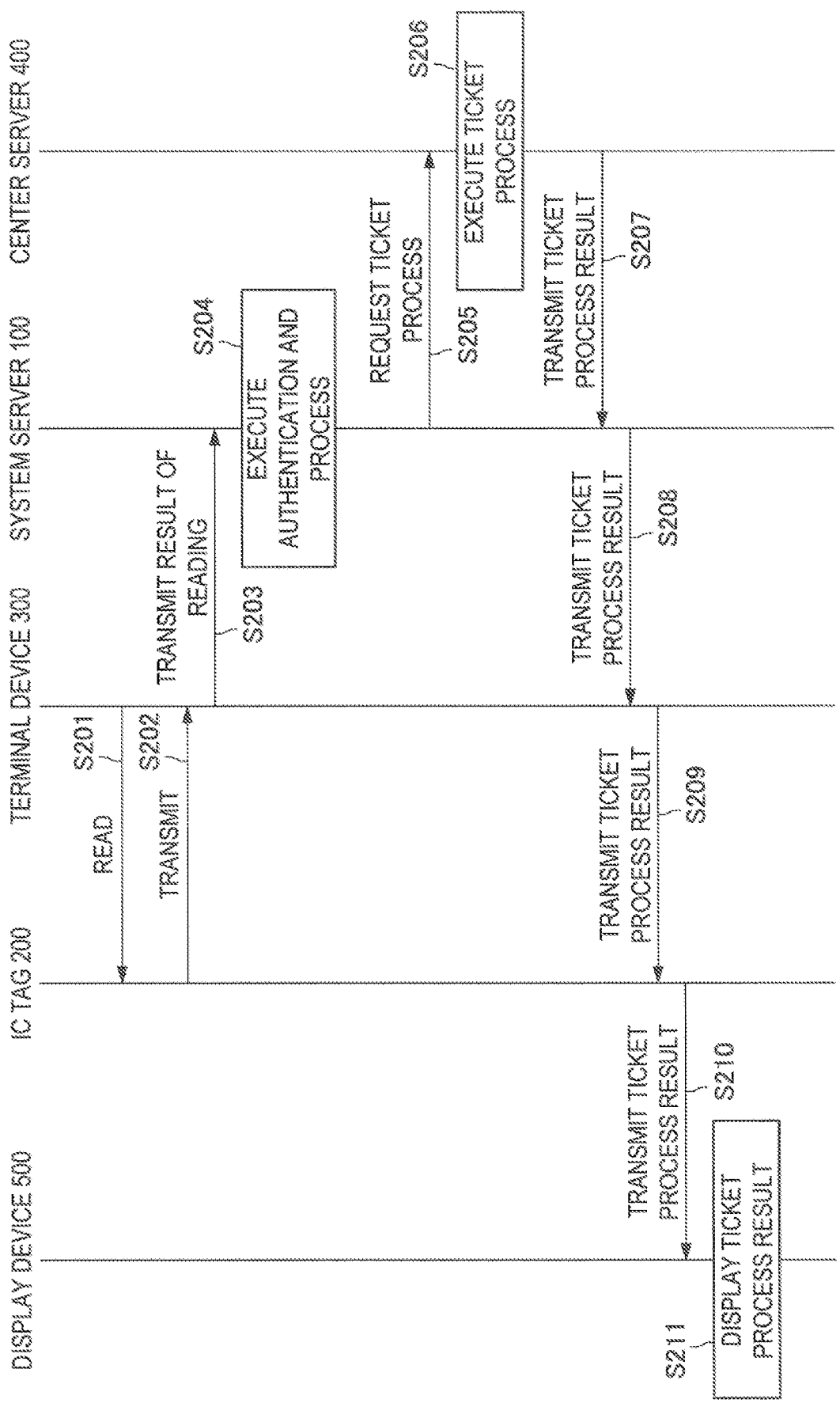
FIG. 8 is a flowchart showing an operation example of the respective devices constituting the information processing system 1 according to an embodiment of the present disclosure.

FIG. 8 is a flowchart showing another operation example of the respective devices constituting the information processing system 1 according to an embodiment of the present disclosure. The flowchart shown in FIG. 8 is an operation example when an electronic ticket service that the center server 400 provides is attempted to be received using the terminal device 300. Hereinbelow, the operation example of the respective devices constituting the information processing system 1 according to the embodiment of the present disclosure will be described using FIG. 8.

When the center server 400 provides the electronic ticket service, the IC tag 200 is installed in an entrance gate of a facility or the like along with the display device 500. The user of the terminal device 300 purchases the ticket to enter the facility, and registers information of the ticket in the center server 400 in advance. Then, the user of the terminal device 300 holds the terminal device 300 over the IC tag 200 installed in the entrance gate of the facility or the like when entering the facility, and thereby can enter the facility. Based on the premise described above, the operation example of the respective devices constituting the information processing system 1 according to the embodiment of the present disclosure will be described using FIG. 8.

The user of the terminal device 300 holds the terminal device 300 over the IC tag 200 in a state in which, for example, an application for receiving the electronic ticket service is being executed in the terminal device 300, or an application that does not depend on a specific service is being executed in the terminal device 300. The terminal device 300 reads information recorded in the IC tag 200 using the near field communication unit 313 (Step S201). The information of the IC tag 200 that the terminal device 300 reads here is authentication information retained in the authentication information retaining unit 220 and identification information retained in the identification information retaining unit 230. The IC tag 200 transmits the authentication information and the identification information to the terminal device 300 from the near field communication unit 210 (Step S202).

When the authentication information and the identification information transmitted from the IC tag 200 have been received with the near field communication unit 313, the terminal device 300 transmits the received authentication information and the identification information of the IC tag 200 to the system server 100 with the wireless communication unit 311 (Step S203). Further, the terminal device 300 also transmits information for receiving the electronic ticket service that the center server 400 provides to the system server 100. The information for receiving the electronic ticket service is, for example, a user ID of the electronic ticket service, or the like.

After receiving the information transmitted from the terminal device 300 with the communication unit 110, the system server 100 acquires the information with the information acquisition unit 120. Then, the system server 100 causes the authentication unit 130 to execute an authentication process with respect to the IC tag 200 using the information transmitted from the terminal device 300, and when the IC tag 200 has been authenticated, the system server causes the process execution unit 140 to execute a process relating to the electronic ticket service based on the information transmitted from the terminal device 300 (Step S204). Then, the system server 100 requests based on the process of Step S204 for an electronic ticket process from the center server 400 using the process execution unit 140 based on the information transmitted from the terminal device 300 (Step S205). The electronic ticket process that the system server 100 requests in Step S205 is a process of inquiring whether there is an electronic ticket that the terminal device 300 can use with respect to the IC tag 200 over which the terminal device 300 has been held.

The center server 400 executes the electronic ticket process according to the inquiry from the system server 100 (Step S206). By performing the electronic ticket service in Step S206, the center server 400 executes checking of whether there is an electronic ticket that the terminal device 300 can use with respect to the IC tag 200 over which the terminal device 300 has been held, and when there is an available electronic ticket, executes a process of confirming the electronic ticket.

The center server 400 replies to the system server 100 with a result of the electronic ticket process of Step S206 (Step S207). Upon accepting the result of the electronic ticket process from the center server 400, the system server 100 transmits the result of the electronic ticket process to the terminal device 300 from the communication unit 110 (Step S208). Upon receiving the result of the process of the center server 400 with the wireless communication unit 311, the terminal device 300 transmits the received result of the electronic ticket process of the center server 400 to the IC tag 200 with the near field communication unit 313 through the near field communication (Step S209).

Upon receiving the result of the electronic ticket process of the center server 400 from the terminal device 300 through the near field communication, the IC tag 200 transmits the received result of the electronic ticket process to the display device 500 (Step S210). The display unit 500 displays the result of the electronic ticket process received from the IC tag 200 (Step S211). As the display unit 500 displays the result of the electronic ticket process of the center server 400, the user of the terminal device 300 and a clerk at the entrance gate of the facility can ascertain whether or not the user of the terminal device 300 possesses a valid ticket. Note that, although the system server 100 authenticates the IC tag 200 using the information transmitted from the terminal device 300 in Step S203 in the flowchart shown in FIG. 8, the present disclosure is not limited thereto. For example, the system server 100 may perform mutual authentication with the IC tag 200, then read the tag ID of the IC tag 200 through the terminal device 300 as shown in FIG. 5, and then request the electronic ticket process from the center server 400 based on the information transmitted from the terminal device 300.

Figure 9:
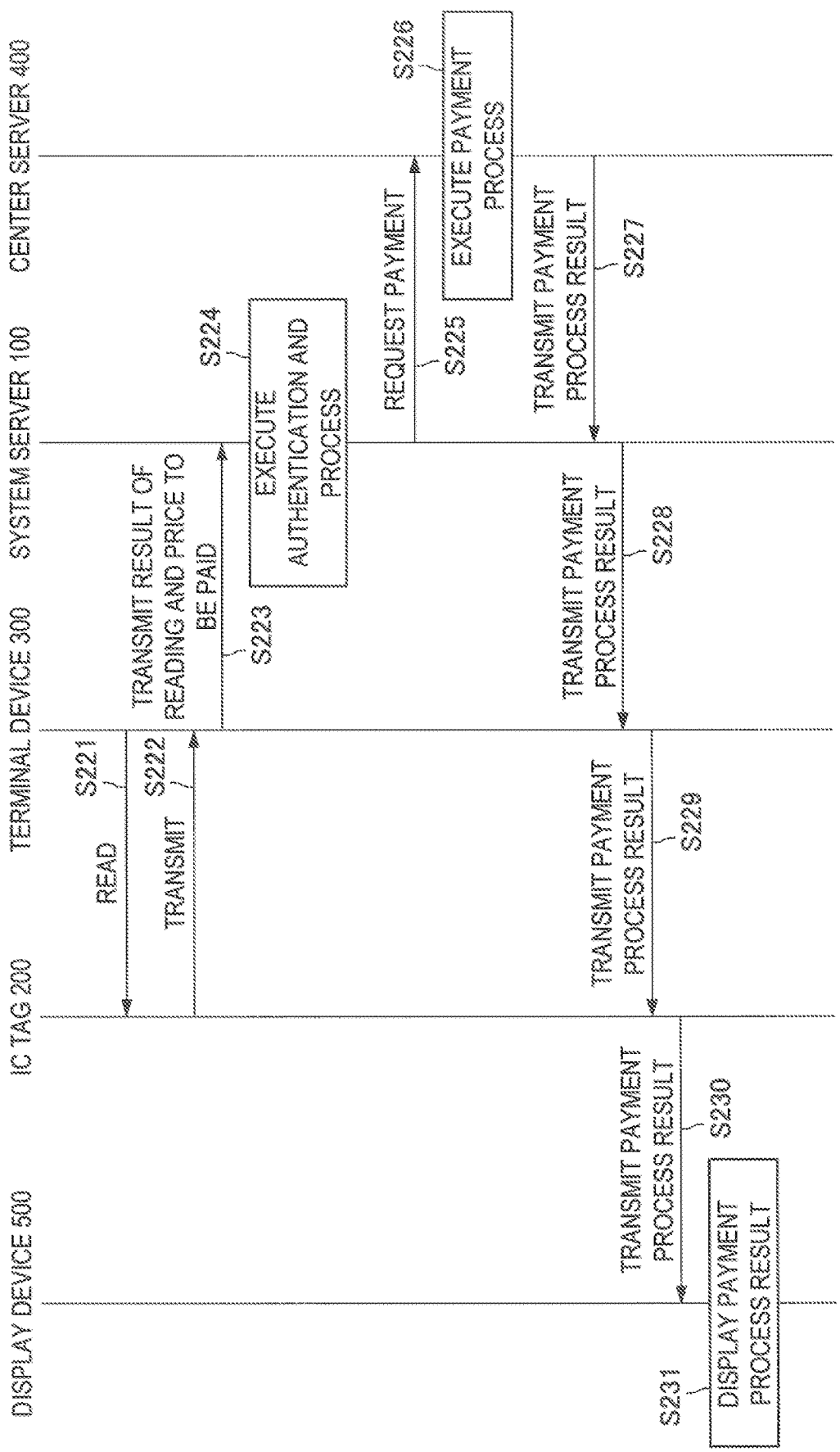
FIG. 9 is a flowchart showing another operation example of the respective devices constituting the information processing system 1 according to an embodiment of the present disclosure.

FIG. 9 is a flowchart showing another operation example of the respective devices constituting the information processing system 1 according to an embodiment of the present disclosure. The flowchart shown in FIG. 9 shows an operation example performed when a payment service that uses electronic money that the center server 400 provides is attempted to be received using the terminal device 300. Hereinbelow, the operation example of the respective devices constituting the information processing system 1 according to the embodiment of the present disclosure will be described using FIG. 9.

When the center server 400 provides the payment service that uses electronic money, the IC tag 200 is installed in a check-out place of a store along with the display device 500. The user of the terminal device 300 registers for an electronic money service and deposits electronic money that he or she will use for the electronic money service in the center server 400 in advance. Then, the user of the terminal device 300 holds the terminal device 300 over the IC tag 200 installed in the check-out place of the store when paying a product price in the store, and thereby can pay the product price using the electronic money. Based on the premise described above, the operation example of the respective devices constituting the information processing system 1 according to the embodiment of the present disclosure will be described using FIG. 9.

The user of the terminal device 300 holds the terminal device 300 over the IC tag 200 in a state in which, for example, an application for receiving the payment service that uses the electronic money is being executed in the terminal device 300. The terminal device 300 reads information recorded in the IC tag 200 using the near field communication unit 313 (Step S221). The information of the IC tag 200 that the terminal device 300 reads here is the authentication information retained in the authentication information retaining unit 220 and the identification information retained in the identification information retaining unit 230. The IC tag 200 transmits the authentication information and the identification information to the terminal device 300 from the near field communication unit 210 (Step S222).

When the authentication information and the identification information transmitted from the IC tag 200 have been received by the near field communication unit 313, the terminal device 300 transmits the received authentication information and identification information of the IC tag 200 to the system server 100 with the wireless communication unit 311 (Step S223). Furthermore, the terminal device 300 also transmits information for receiving the payment service that uses electronic money that the center server 400 provides to the system server 100. The information for receiving the payment service that uses electronic money is, for example, a user ID of the payment service that uses electronic money, information of the product price to be paid, and the like. Note that the information for receiving the payment service that uses electronic money may be transmitted to the system server 100 in Step S223, or may be transmitted directly to the center server 400 through communication performed between the center server 400 and the display device 500.

After receiving the information transmitted from the terminal device 300 with the communication unit 110, the system server 100 acquires the information with the information acquisition unit 120. Then, the system server 100 causes the authentication unit 130 to execute an authentication process of the IC tag 200 using the information transmitted from the terminal device 300, and when the IC tag 200 has been authenticated, causes the process execution unit 140 to execute a process relating to the payment service that uses electronic money based on the information transmitted from the terminal device 300 (Step S224). Then, the system server 100 requests, using the process execution unit 140, a payment process for using electronic money from the center server 400 based on the information transmitted from the terminal device 300 based on the process of Step S224 (Step S225). The payment process for using electronic money that the system server 100 requests in Step S225 is a process of inquiring whether there is electronic money that the terminal device 300 can use for the IC tag 200 over which the terminal device 300 has been held, and whether payment is possible using the balance.

The center server 400 executes the payment service using electronic money in response to the inquiry from the system server 100 (Step S226). For the execution of the payment service using electronic money in Step S226, the center server 400 checks whether there is electronic money that the terminal device 300 can use with respect to the IC tag 200 over which the terminal device 300 has been held, and when there is available electronic money, executes the payment service using the balance of the electronic money.

The center server 400 replies to the system server 100 with a result of the payment process for using electronic money of Step S226 (Step S227). When the result of the payment process for using electronic money has been received from the center server 400, the system server 100 transmits the result of the payment process for using electronic money to the terminal device 300 from the communication unit 110 (Step S228). When the result of the payment process for using electronic money performed by the center server 400 has been received with the wireless communication unit 311, the terminal device 300 transmits the received payment process for using electronic money performed by the center server 400 to the IC tag 200 with the near field communication unit 313 through the near field communication (Step S229).

When the result of the payment using electronic money by the center server 400 has been received from the terminal device 300 through the near field communication, the IC tag 200 transmits the received result of the payment process for using electronic money to the display device 500 (Step S230). The display device 500 displays the result of the payment process for using electronic money received from the IC tag 200 (Step S231). As the display device 500 displays the result of the payment process for using electronic money performed by the center server 400, the user of the terminal device 300 and a clerk of the store can ascertain whether or not the payment using the electronic money is successful. Note that, although the system server 100 authenticates the IC tag 200 using the information transmitted from the terminal device 300 in Step S223 in the flowchart shown in FIG. 9, the present disclosure is not limited thereto. For example, the system server 100 may perform mutual authentication with the IC tag 200, then read the tag ID of the IC tag 200 through the terminal device 300 as shown in FIG. 5, and then request the payment process with respect to the product price from the center server 400 based on the information transmitted from the terminal device 300.

So far, the operation examples of the respective devices constituting the information processing system 1 according to the embodiments of the present disclosure have been described exemplifying more specific examples. Of course, it is needless to say that circumstances in which the information processing system 1 according to the embodiment of the present disclosure is used are not limited to the above. When, for example, the center server 400 performs a service of providing electronic coupons, the center server 400 can provide a proper coupon to the terminal device 300 according to a result of the near field communication between the IC tag 200 and the terminal device 300.

Next, a modified example of the information processing system 1 according to the embodiment of the present disclosure will be described. In the information processing system 1 described above, the terminal device 300 being near the IC tag 200 is taken as an opportunity to perform the series of processes. Hereinbelow, a configuration and an operation example of the information processing system 1 applied when the IC tag 200 is incorporated into a terminal device will be described.

Figure 10:
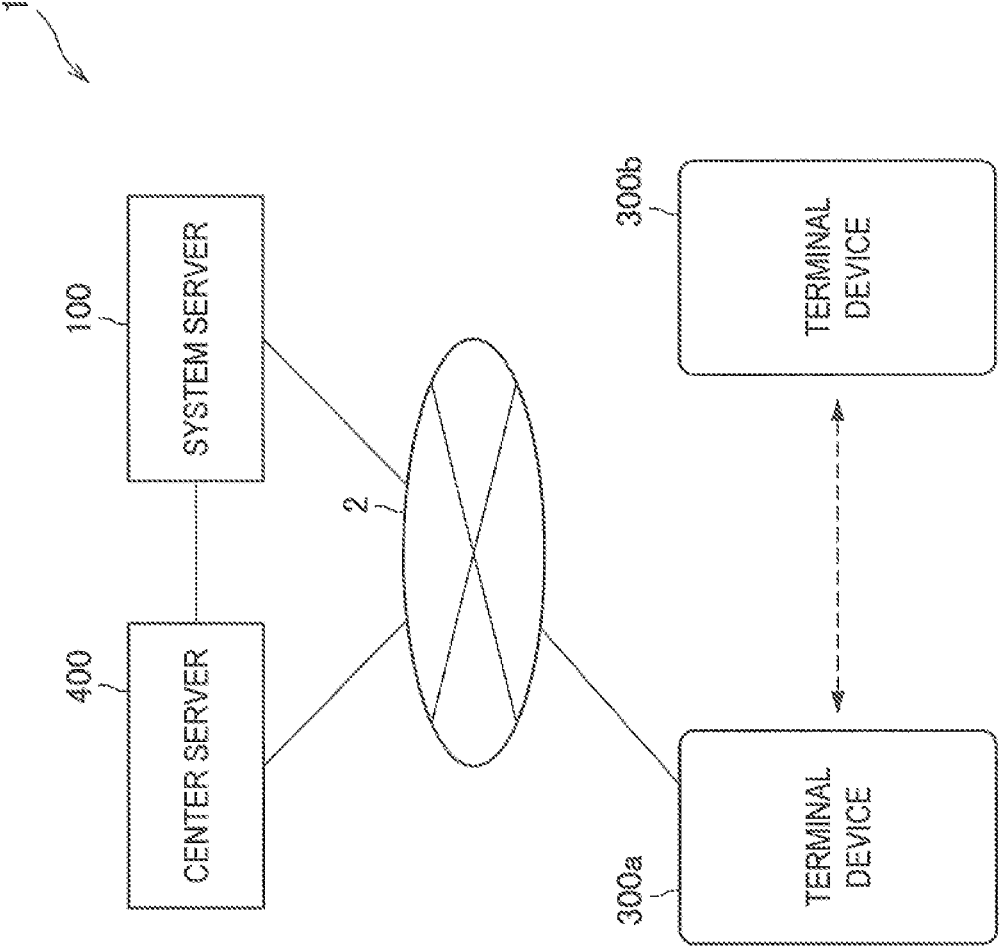
FIG. 10 is an illustrative diagram showing a modified example of the information processing system 1 according to an embodiment of the present disclosure.

FIG. 10 is an illustrative diagram showing the modified example of the information processing system 1 according to the embodiment of the present disclosure. In FIG. 10, terminal devices 300a and 300b are shown instead of the IC tag 200 and the terminal device 300 shown in FIG. 1. The terminal device 300a is the same as the terminal device 300 that has been described so far. In addition, the terminal device 300*b* is a terminal device into which the IC tag 200 that has been described so far is incorporated.

In the modified example of the information processing system 1 according to the embodiment of the present disclosure shown in FIG. 10, holding of the terminal device 300*a* over the terminal device 300*b* is taken as an opportunity to perform a series of processes.

Figure 11:
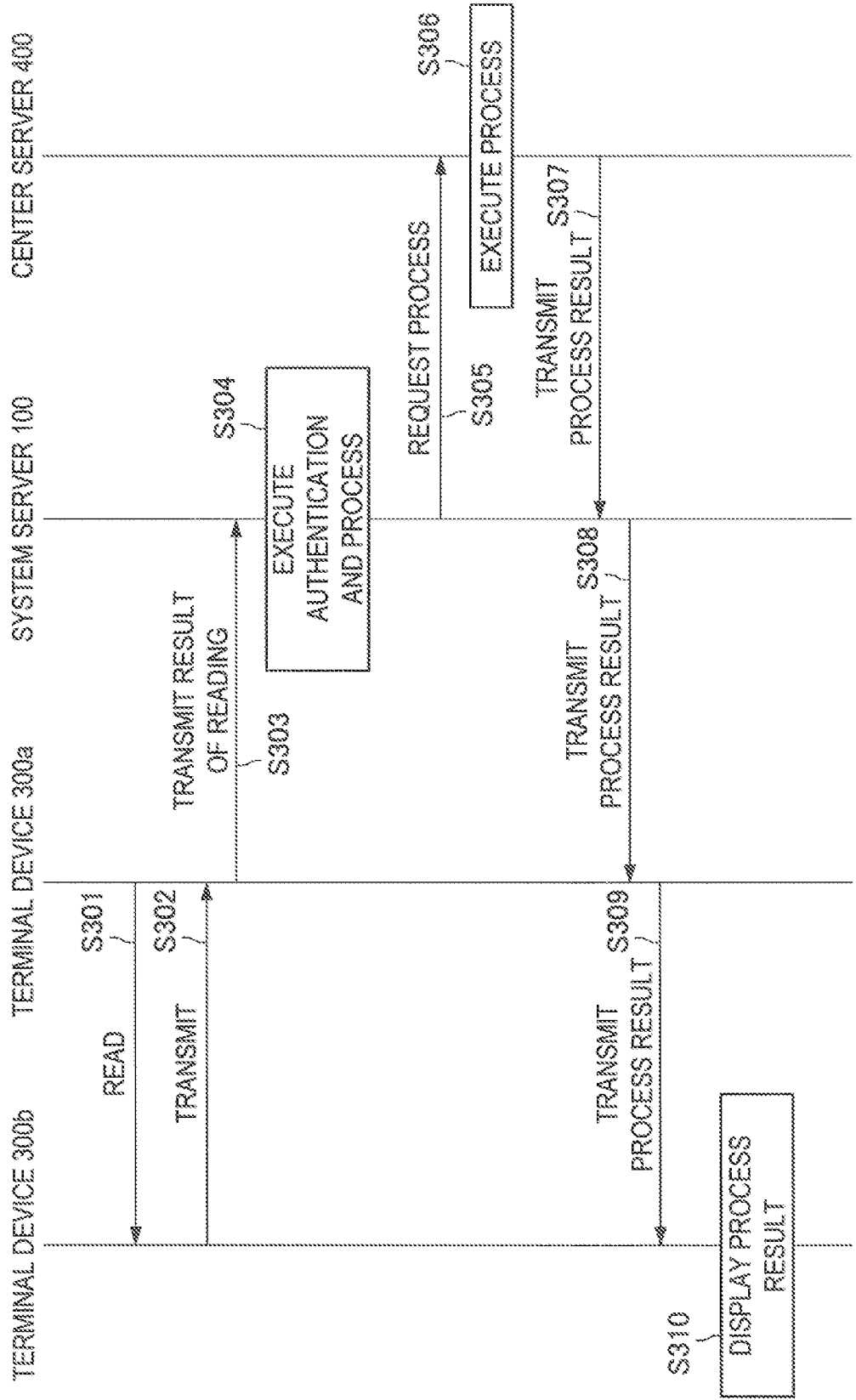
FIG. 11 is a flowchart showing an operation example of respective devices in the modified example of the information processing system 1 according to the embodiment of the present disclosure shown in FIG. 10.

FIG. 11 is a flowchart showing an operation example of the respective devices in the modified example of the information processing system 1 according to the embodiment of the present disclosure shown in FIG. 10. When the terminal device 300*a* is held over the terminal device 300*b* and then the terminal device 300*a* starts reading information recorded in an IC tag of the terminal device 300*b* through near field communication (Step S301), the terminal device 300*b* provides the terminal device 300*a* with the information recorded in the IC tag of the terminal device 300*b* (authentication information and identification information) through the near field communication (Step S302).

When the information recorded in the IC tag of the terminal device 300*b* (authentication information and identification information) has been read through the near field communication, the terminal device 300*a* transmits a result of the reading to the system server 100 (Step S303). Note that, when transmitting the authentication information and the identification information recorded in the IC tag of the terminal device 300*b* to the system server 100 in Step S303, information set or input in the terminal device 300*a* may also be transmitted to the system server 100.

After receiving the information transmitted from the terminal device 300*a* with the communication unit 110, the system server 100 acquires the information with the information acquisition unit 120. Then, the system server 100 causes the authentication unit 130 to execute an authentication process of the IC tag of the terminal device 300*b* using the information transmitted from the terminal device 300*a*, and when the IC tag of the terminal device 300*b* has been authenticated, causes the process execution unit 140 to execute a process based on the information transmitted from the terminal device 300 (Step S304). Then, the system server 100 requests, from the center server 400, a process based on the information transmitted from the terminal device 300*a* using the process execution unit 140 based on the process of Step S304 (Step S305).

The center server 400 executes the process based on the request from the system server 100 (Step S306), and then replies to the system server 100 with a result of the process (Step S307). When the result of the process has been received from the center server 400, the system server 100 transmits the result of the process to the terminal device 300*a* from the communication unit 110 (Step S308). When the result of the process performed by the center server 400 has been received, the terminal device 300*a* transmits the received result of the process performed by the center server 400 to the terminal device 300*b* through the near field communication (Step S309). The terminal device 300*b* displays the result of the process performed by the center server 400 if necessary (Step S310).

As the respective devices in the modified example of the information processing system 1 according to the embodiment of the present disclosure shown in FIG. 10 execute the operation shown in FIG. 11, the result of the near field communication between the terminal device 300*a* and the terminal device 300*b* can be displayed in the terminal device 300*b*. Note that, although the system server 100 authenticates the IC tag 200 using the information transmitted from the terminal device 300 in Step S223 in the flowchart shown in FIG. 11, the present disclosure is not limited thereto. For example, as shown in FIG. 5, the system server 100 may perform mutual authentication with the IC tag 200, then read the tag ID of the IC tag 200 through the terminal device 300, and then request the process from the center server 400 based on the information transmitted from the terminal device 300.

Figure 12:
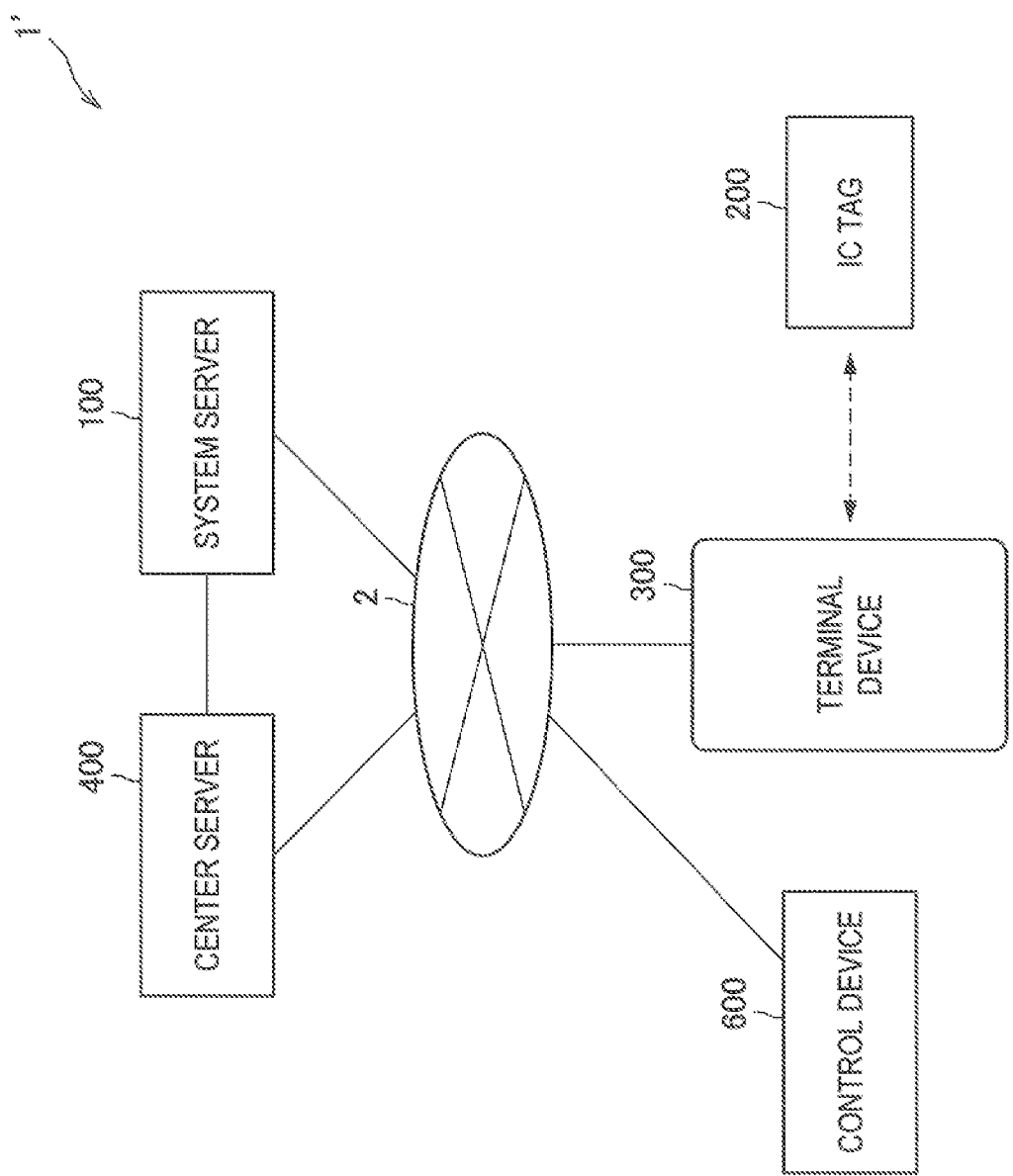
FIG. 12 is an illustrative diagram showing another modified example of the information processing system 1 according to an embodiment of the present disclosure.

FIG. 12 is an illustrative diagram showing another modified example of the information processing system 1 according to an embodiment of the present disclosure. In FIG. 12, the information processing system 1 in which a new control device 600 is connected to the network 2 is shown. The control device 600 executes control according to results of the near field communication between the IC tag 200 and the terminal device 300. As an example of control executed by the control device 600, for example, there are control of locking or unlocking a key of a door, control of opening and closing a door of an automatic ticket checker at a station, and the like.

As the modified example of the information processing system 1 according to the embodiment of the present disclosure has the configuration shown in FIG. 12, the control device 600 can be caused to execute control according to a result of the near field communication between the IC tag 200 and the terminal device 300.

Figure 13:
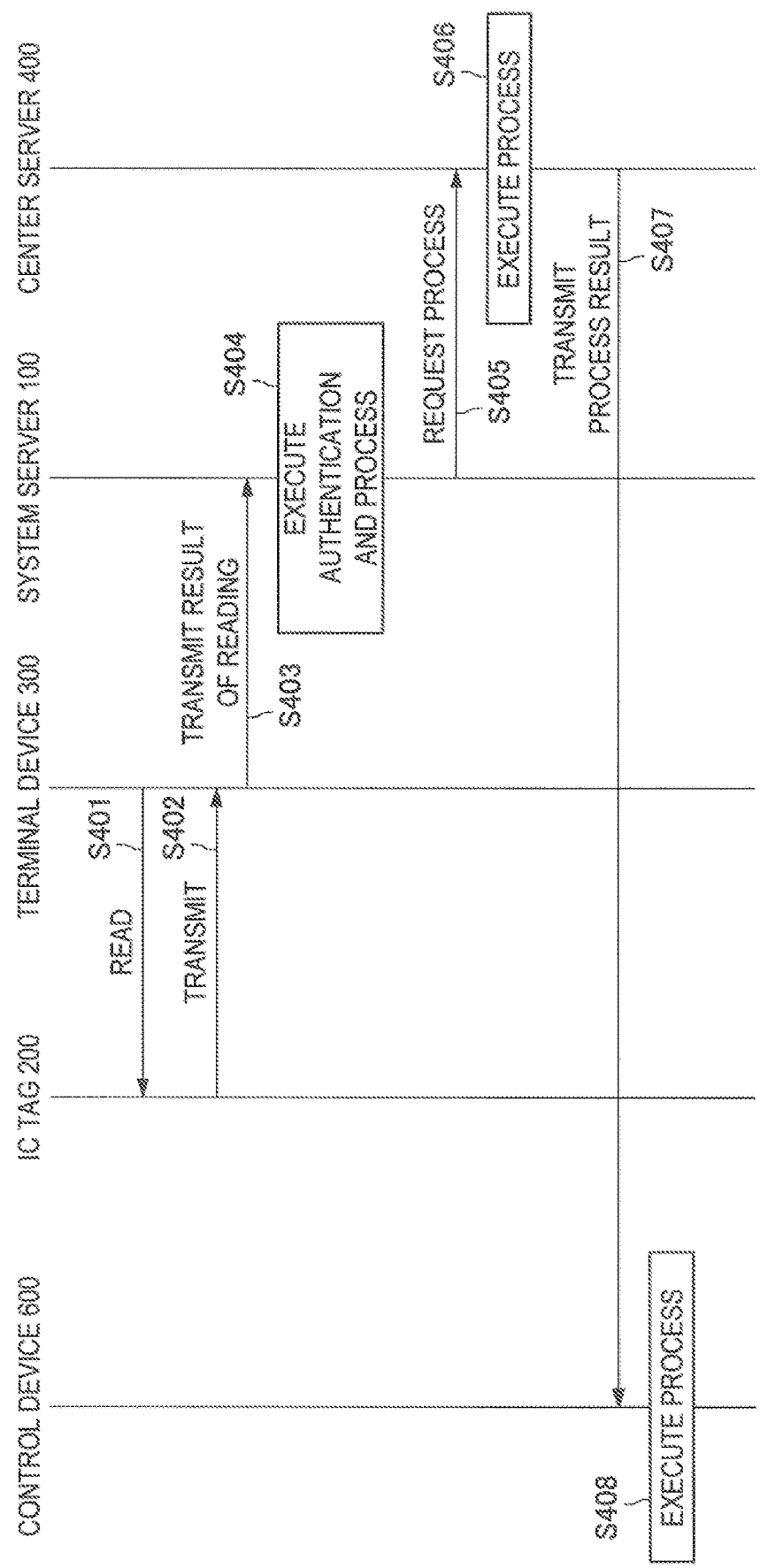
FIG. 13 is a flowchart showing an operation example of respective devices in the modified example of the information processing system 1 according to the embodiment of the present disclosure shown in FIG. 12.

FIG. 13 is a flowchart showing an operation example of the respective devices in the modified example of the information processing system 1 according to the embodiment of the present disclosure shown in FIG. 12. When the terminal device 300 is held over the IC tag 200 and then the terminal device 300 starts reading information recorded in the IC tag 200 through the near field communication (Step S401), the IC tag 200 provides the recorded information (authentication information and identification information) to the terminal device 300 in the near field communication (Step S402).

When the terminal device 300 has read the information recorded in the IC tag 200 (authentication information and identification information) in the near field communication, the terminal device transmits a result of the reading to the system server 100 (Step S403). Note that, when the terminal device 300 transmits the authentication information and the identification information recorded in the IC tag 200 to the system server 100 in Step S303, information set or input in the terminal device 300 may also be transmitted to the system server 100.

After receiving the information transmitted from the terminal device 300 with the communication unit 110, the system server 100 acquires the information with the information acquisition unit 120. Then, the system server 100 causes the authentication unit 130 to execute an authentication process with respect to the IC tag 200 using the information transmitted from the terminal device 300, and when the IC tag 200 has been authenticated, causes the process execution unit 140 to execute a process based on the information transmitted from the terminal device 300 (Step S404). Then, the system server 100 requests a process based on the information transmitted from the terminal device 300 from the center server 400 using the process execution unit 140 based on the process of Step S304 (Step S405).

The center server 400 executes the process based on the request from the system server 100 (Step S406), and then replies to the control device 600 with a result of the process (Step S407). Upon accepting the result of the process from the center server 400, the control device 600 executes a process based on the result of the process (Step S408). As examples of control executed by the control device 600 based on the result of the process of the center server 400, for example, there are control of locking or unlocking a door, control of opening and closing a door of an automatic ticket checker at a station, and the like.

By executing the operation shown in FIG. 13 in the modified example of the information processing system 1 according to the embodiment of the present disclosure shown in FIG. 12, the control device 600 can be caused to execute control according to the result of the near field communication between the IC tag 200 and the terminal device 300. Note that, although the system server 100 authenticates the IC tag 200 using the information transmitted from the terminal device 300 in Step S223 in the flowchart shown in FIG. 13, the present disclosure is not limited thereto. For example, after performing mutual authentication with the IC tag 200, the system server 100 may read a tag ID of the IC tag 200 through the terminal device 300, and then request the process from the center server 400 based on the information transmitted from the terminal device 300 as shown in FIG. 5.

Figure 14:
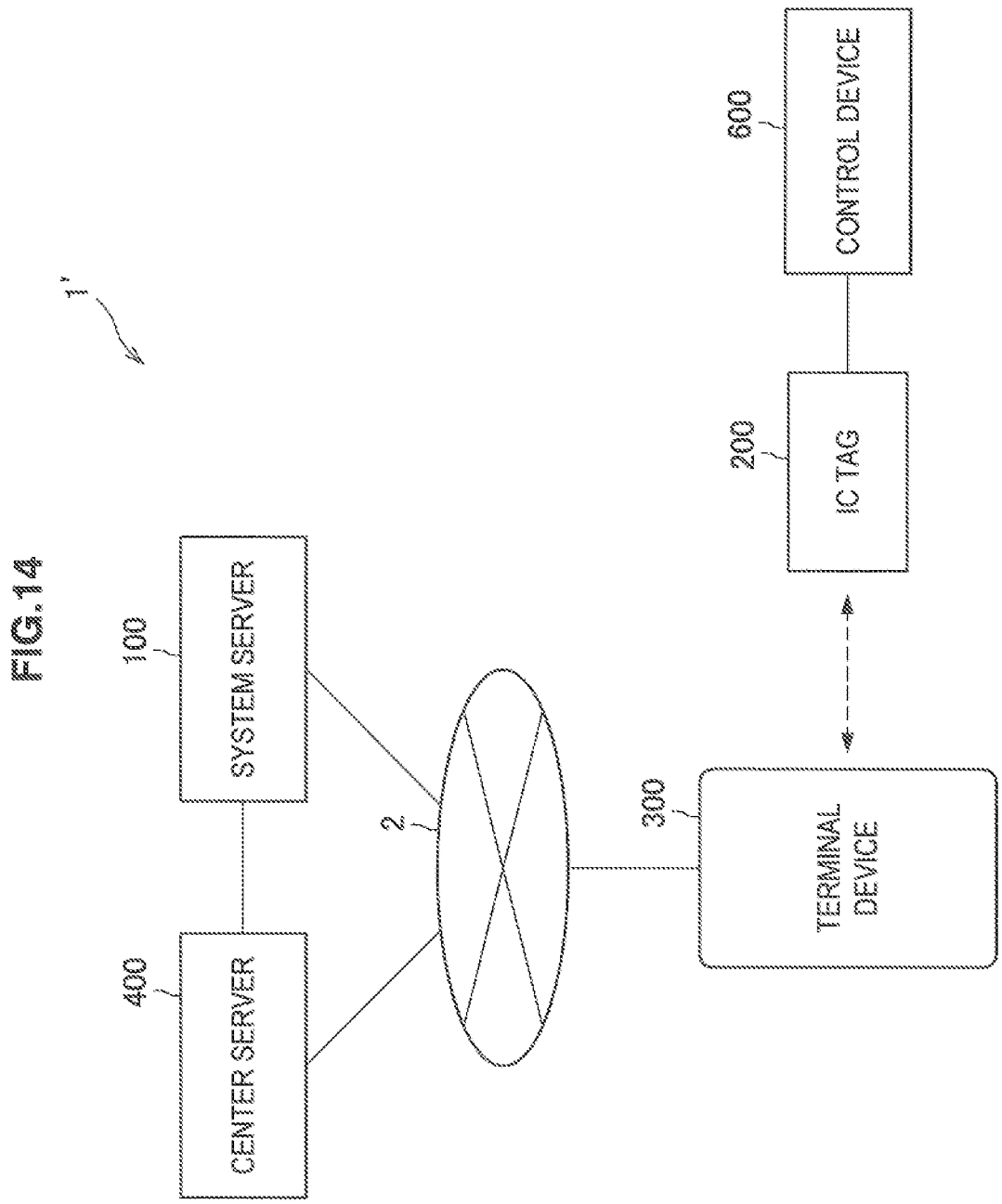
FIG. 14 is an illustrative diagram showing still another modified example of the information processing system 1 according to an embodiment of the present disclosure.

Although the configuration in which the control device 600 is connected to the network 2 is shown in FIG. 12, the present disclosure is not limited thereto. The control device 600 may be connected to the IC tag 200. FIG. 14 is an illustrative diagram showing still another modified example of the information processing system 1 according to an embodiment of the present disclosure. FIG. 14 shows the information processing system 1 in which the control device 600 is connected to the IC tag 200.

Figure 15:
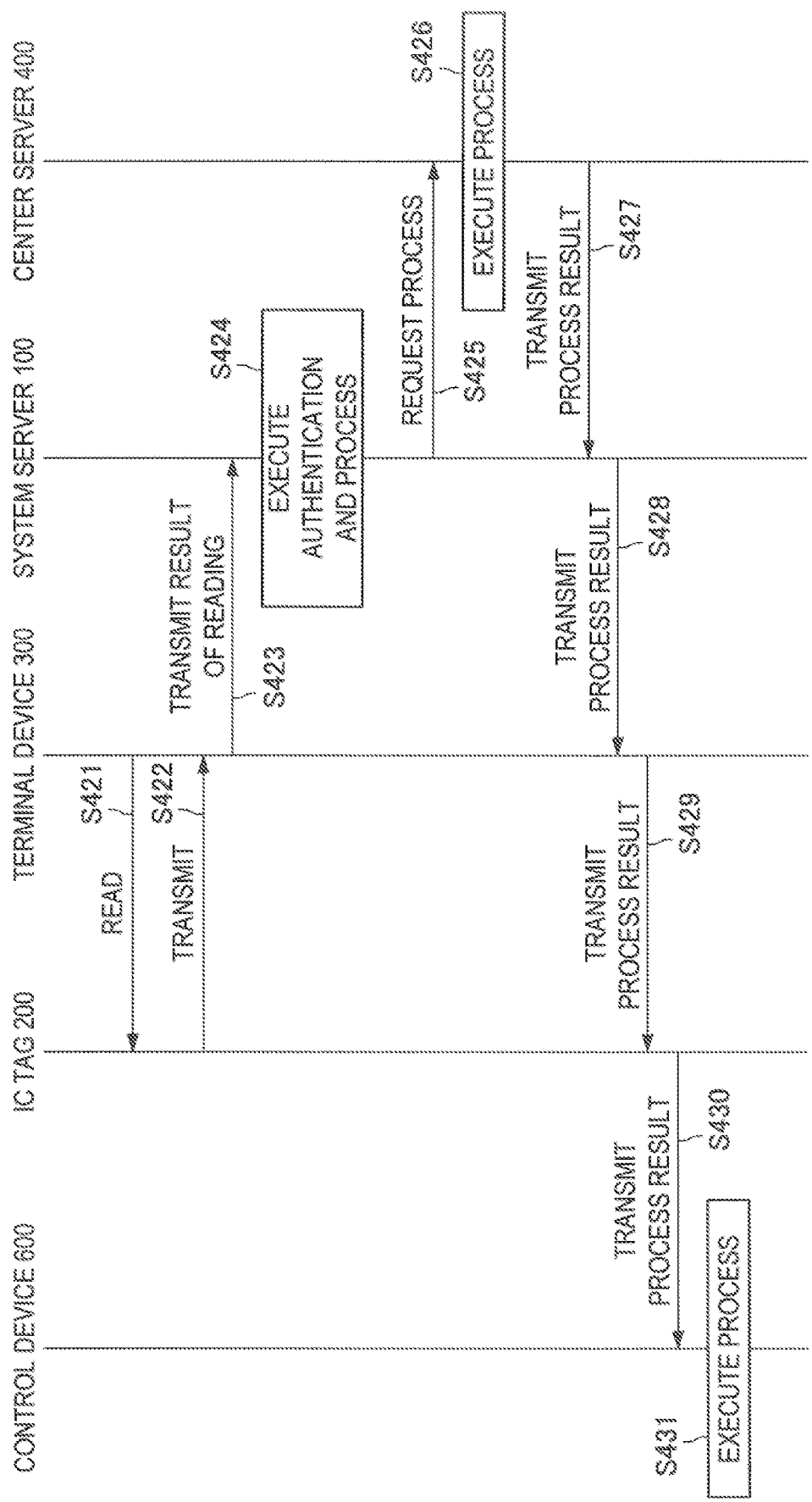
FIG. 15 is a flowchart showing an operation example of respective devices in the modified example of the information processing system 1 according to the embodiment of the present disclosure shown in FIG. 14.

FIG. 15 is a flowchart showing an operation example of the respective devices in the modified example of the information processing system 1 according to the embodiment of the present disclosure shown in FIG. 14. When the terminal device 300 is held over the IC tag 200 and then the terminal device 300 starts reading information recorded in the IC tag 200 through the near field communication (Step S421), the IC tag 200 provides the recorded information (authentication information and identification information) to the terminal device 300 in the near field communication (Step S422).

When the terminal device 300 has read the information recorded in the IC tag 200 (authentication information and identification information), the terminal device transmits a result of the reading to the system server 100 (Step S423). Note that, when the terminal device 300 transmits the authentication information and the identification information recorded in the IC tag 200 to the system server 100 in Step S303, information set or input in the terminal device 300 may also be transmitted to the system server 100.

After receiving the information transmitted from the terminal device 300 with the communication unit 110, the system server 100 acquires the information using the information acquisition unit 120. Then, the system server 100 causes the authentication unit 130 to execute an authentication process with respect to the IC tag 200 using the information transmitted from the terminal device 300, and when the IC tag 200 has been authenticated, causes the process execution unit 140 to execute a process based on the information transmitted from the terminal device 300 (Step S424). Then, the system server 100 requests a process based on the information transmitted from the terminal device 300 from the center server 400 using the process execution unit 140 based on the process of Step S304 (Step S425).

The center server 400 executes the process based on the request from the system server 100 (Step S426), and then replies to the system server 100 with a result of the process (Step S427). Upon accepting the result of the process from the center server 400, the system server 100 transmits the result of the process to the terminal device 300 from the communication unit 110 (Step S428). Upon receiving the result of the process performed by the center server 400, the terminal device 300 transmits the received result of the process performed by the center server 400 to the IC tag 200 through the near field communication (Step S429). Upon receiving the result of the process performed by the center server 400 from the terminal device 300 in the near field communication, the IC tag 200 transmits the received result of the process performed by the center server 400 to the control device 600 (Step S430). Upon accepting the result of the process from the IC tag 200, the control device 600 executes a process based on the result of the process (Step S431).

By executing the operation shown in FIG. 15 in the modified example of the information processing system 1 according to the embodiment of the present disclosure shown in FIG. 14, the control device 600 that is connected to the IC tag 200 can be caused to execute control according to the result of the near field communication between the IC tag 200 and the terminal device 300. Note that, although the system server 100 authenticates the IC tag 200 using the information transmitted from the terminal device 300 in Step S424 in the flowchart shown in FIG. 15, the present disclosure is not limited thereto. For example, after performing mutual authentication with the IC tag 200, the system server 100 may read a tag ID of the IC tag 200 through the terminal device 300, and then request the process based on the information transmitted from the terminal device 300 from the center server 400 as shown in FIG. 5.

So far, the modified examples of the information processing system 1 according to the embodiment of the present disclosure have been described. Of course, it is needless to say that a modified example of the information processing system 1 according to the embodiment of the present disclosure is not limited to the examples described above. The information processing system 1 according to the embodiment of the present disclosure can adopt variously modified examples in addition to those described above as long as the system server 100 can take the opportunity of the near field communication between the IC tag 200 and the terminal device 300 to execute the process based on the information transmitted by the terminal device 300.

In addition, as described above, the system server 100 decides content to be processed using the information of the tag ID and the user ID (or the terminal ID) transmitted from the terminal device 300. Herein, the user ID used in the information processing system 1 according to the embodiment of the present disclosure may be categorized into a plurality of levels. For example, the user ID may be categorized into four levels as below.

Level 0: ID based on a PIN or biometric authentication
Level 1: ID based on a trusted execution environment (TEE) or the like
Level 2: ID based on authentication of an embedded secure element (SE)
Level 3: ID based on authentication of a universal integrated circuit card (UICC)

When the user of the terminal device 300 holds the terminal device 300 over the IC tag 200, the terminal device 300 transmits the tag ID and the user ID to the system server 100. At this time, the terminal device 300 may transmit the category of the user ID to the system server 100. For example, when the user ID is categorized into the four levels described above, the system server 100 may manage the categories of the user ID in a form corresponding to bits.

Further, in the information processing system 1 according to the embodiment of the present disclosure, generation of an application activation instruction and a linkage process to another service may be performed using the information of the categories of the user ID in addition to the tag ID and the user ID. For example, when a service that is close to distribution of a paper coupon is to be provided, the information processing system 1 according to the embodiment of the present disclosure allows the service even when the category of the user ID is Level 0; however, when a ticketing service, a payment service, or the like is to be provided, the information processing system may control such that use of such a service is not allowed when the category of the user ID is Level 0 or 1, but use of the service is allowed at Level 2 or 3. In addition, when a service associated with a cloud service of a mobile network operator (MNO) is to be provided, the information processing system 1 according to the embodiment of the present disclosure may also control such that use of the service is allowed only when the category of the user ID is Level 3.

As described above, the information processing system 1 according to the embodiment of the present disclosure can control a service level according to a category of the user ID transmitted from the terminal device 300 to the system server 100.

2. CONCLUSION

In the information processing system 1 according to the embodiments of the present disclosure, the respective devices execute operations take the opportunity of the near field communication between the terminal device 300 and the IC tag 200 to execute operations as described above. In addition, since the center server 400 manages value in the information processing system 1 according to the embodiments of the present disclosure without letting the terminal device 300 carry such value as described above, it is not necessary to provide an IC chip having a tamper resistance property in the terminal device 300. In the information processing system 1 according to the embodiments of the present disclosure, the IC tag 200 is authenticated by the system server 100 when the terminal device 300 is held over the IC tag 200.

Therefore, in the information processing system 1 according to the embodiments of the present disclosure, secure exchange of information is possible during the near field communication while suppressing costs of the terminal device 300 and boosting convenience for a user who uses the terminal device 300.

The respective steps of the processes executed by each of the devices of the present specification are not necessarily performed in the order disclosed in the sequence diagram or the flowchart in a time series manner. The respective steps of the processes executed by each of the devices may be performed in a different order from the order disclosed in the flowchart, or performed in parallel.

In addition, a computer program for causing hardware such as a CPU, a ROM, and a RAM included in each device to exhibit functions equivalent to the configuration of each device described above can also be created. In addition, a storage medium in which the computer program is stored can also be provided. Further, by configuring the respective functional blocks shown in the functional block diagrams as hardware, a series of process can be realized by the hardware.

The preferred embodiment of the present disclosure has been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing system including:

a server device; and a non-contact communication tag of which information is readable through near field communication, wherein the non-contact communication tag includes:

an identification information retaining unit configured to retain identification information for uniquely identifying the non-contact communication tag;

an authentication information retaining unit configured to retain authentication information to be used in authentication of the non-contact communication tag; and a near field communication unit configured to transmit the identification information that the identification information retaining unit retains and the authentication information that the authentication information retaining unit retains to another device, which will transmit the received identification information and authentication information to the server device, in near field communication with the other device, and wherein the server device includes:

an information acquisition unit configured to acquire the identification information, the authentication information, and other information transmitted from the other device;

an authentication unit configured to authenticate the non-contact communication tag using the authentication information; and a process execution unit configured to execute a process according to the other information and the identification information that the information acquisition unit acquires after the authentication of the non-contact communication tag by the authentication unit.

(2)

The information processing system according to (1), wherein the process execution unit executes an authentication process with respect to the other device using the other information.

(3)

The information processing system according to (2), wherein the information transmitted from the other device to the server device further includes information of a product price, and wherein the process execution unit executes the authentication process with respect to the other device and a payment process of the product price for the other device using the information of the product price and the identification information transmitted from the other device.

(4)

The information processing system according to any one of (1) to (3), wherein the process execution unit executes a process relating to content that is available in the other device using the other information and the identification information.

(5)

The information processing system according to (4), wherein the content that is available in the other device is a ticket.

(6)

The information processing system according to (4), wherein the content that is available in the other device is a coupon.

(7)

The information processing system according to any one of (1) to (6), wherein the process execution unit replies to the non-contact communication tag with a result of execution of a process according to the other information and the identification information through the other device.

(8)

The information processing system according to (7), wherein the non-contact communication tag further includes an information display unit configured to display the result of the execution of the process by the process execution unit.

(9)

The information processing system according to any one of (1) to (8), further including:
a terminal device configured as the other device to execute near field communication with the non-contact communication tag.

(10)

The information processing system according to (9), wherein the terminal device includes:
a near field communication unit configured to execute near field communication with the non-contact communication tag; and
a communication unit configured to execute communication with the server device, and
wherein the communication unit transmits information of the terminal device at the time of near field communication with the non-contact communication tag and the identification information acquired from the non-contact communication tag to the server device.

(11)

An information processing method including:
a step of transmitting identification information for uniquely identifying a non-contact communication tag and authentication information used to authenticate the non-contact communication tag, which are received in near field communication between the non-contact communication tag and another device, to the other device that will transmit the identification information and the authentication information to a server device;
a step of acquiring the identification information, the authentication information, and other information transmitted from the other device with the server device;
a step of authenticating the non-contact communication tag with the server device using the authentication information; and
a step of executing a process according to the acquired other information and identification information with the server device after the authentication of the non-contact communication tag in the step of authentication.

REFERENCE SIGNS LIST

1 information processing system
100 system server
110 communication unit
120 information acquisition unit
130 authentication unit
140 process execution unit
200 IC tag
210 near field communication unit
220 authentication information retaining unit
230 identification information retaining unit
300 terminal device
400 center server

The invention claimed is:

1. An information processing system, comprising:
a server device; and
a non-contact communication tag, wherein information of the non-contact communication tag is readable through a near field communication (NFC), wherein
the non-contact communication tag is configured to:
   retain identification information that uniquely identifies the non-contact communication tag;
   retain authentication information, wherein authentication of the non-contact communication tag occurs based on the authentication information;
   encrypt the retained identification information and the retained authentication information; and
   transmit the encrypted identification information and the encrypted authentication information to a terminal device based on the near field communication between the non-contact communication tag and the terminal device,
the terminal device is configured to transmit the encrypted identification information and the encrypted authentication information to the server device, and
the server device is configured to:
   acquire, from the terminal device, the encrypted identification information and the encrypted authentication information;
   decrypt the encrypted identification information and the encrypted authentication information;
   authenticate the non-contact communication tag based on the decrypted authentication information;
   transmit a request to the terminal device;
   receive first information from the terminal device based on the transmitted request, wherein the received first information includes information for identification of a service and user information input in the terminal device;
   authenticate the terminal device based on the received first information;
   store the decrypted identification information in association with attribute information of the non-contact communication tag, wherein the attribute information indicates an operation associated with the service;
   receive a category of user identification information from the terminal device, wherein the category of the user identification information corresponds to a specific level of authentication of the user identification information;
   control the terminal device causing activation of an application in the terminal device, wherein the control of the terminal device is based on the attribute information and the category of the user identification information;
   determine the category of the user identification information received from the terminal device is equal to or greater than a threshold level;
   permit execution of a first process associated with the service based on the determination; and
   execute the first process associated with the service based on the first information, the decrypted identification information, and the category of the user identification information,
      wherein the first process is executed after the authentication of the non-contact communication tag.

2. The information processing system according to claim 1, wherein
the identification information transmitted from the terminal device to the server device includes second information of a product price, and
the server device is further configured to execute a payment of the product price based on the second information of the product price and the identification information transmitted from the terminal device.

3. The information processing system according to claim 1, wherein
the server device is further configured to execute a second process associated with content in the terminal device, and
the second process is executed based on device information received from the terminal device and the identification information.

4. The information processing system according to claim 3, wherein the content available in the terminal device is a ticket.

5. The information processing system according to claim 3, wherein the content available in the terminal device is a coupon.

6. The information processing system according to claim 1, wherein
the server device is further configured to transmit a result of the execution of the first process to the non-contact communication tag, and
the result is transmitted via the terminal device.

7. The information processing system according to claim 6, wherein the non-contact communication tag is further configured to display the result of the execution of the first process.

8. The information processing system according to claim 1, further comprising:
the terminal device, wherein the terminal device is further configured to execute the near field communication with the non-contact communication tag.

9. The information processing system according to claim 8, wherein the terminal device is further configured to:
communicate with the server device; and
transmit the first information, device information of the terminal device, and the identification information acquired from the non-contact communication tag to the server device.

10. The information processing system according to claim 1, wherein the attribute information further includes a position attribute of the non-contact communication tag.

11. The information processing system according to claim 1, wherein the attribute information designates a universal resource locator (URL), and the operation comprises activation of a browser application by the terminal device to connect to the URL.

12. The information processing system according to claim 1, wherein the attribute information designates the application, and the operation comprises the activation of the designated application by the terminal device.

13. The information processing system according to claim 1, wherein the user identification information is categorized into a specific level among a plurality of levels of authentication.

14. An information processing method executed by a server device, comprising:
acquiring, from a terminal device, identification information and authentication information, wherein
the identification information uniquely identifies a non-contact communication tag,
authentication of the non-contact communication tag occurs based on the authentication information,
the non-contact communication tag encrypts the identification information and the authentication information, and
the encrypted identification information and the encrypted authentication information are transmitted from the non-contact communication tag to the terminal device based on a near field communication (NFC) between the non-contact communication tag and the terminal device;
decrypting the encrypted identification information and the encrypted authentication information;
authenticating the non-contact communication tag based on the decrypted authentication information;
transmitting a request to the terminal device;
receiving information from the terminal device based on the transmitted request, wherein the received information includes information for identification of a service and user information input in the terminal device;
authenticating the terminal device based on the received information;
storing the decrypted identification information in association with attribute information of the non-contact communication tag, wherein the attribute information indicates an operation associated with the service;
receiving a category of user identification information from the terminal device, wherein the category of the user identification information corresponds to a specific level of authentication of the user identification information;
controlling the terminal device causing activation of an application in the terminal device, wherein the control of the terminal device is based on the attribute information and the category of the user identification information;
determining the category of the user identification information received from the terminal device is equal to or greater than a threshold level;
permitting execution of a process associated with the service based on the determination; and
executing the process associated with the service based on the received information, the decrypted identification information, and the user identification information, wherein the process is executed after the authentication of the non-contact communication tag.

* * * * *